(12) United States Patent
Oka

(10) Patent No.: US 7,397,971 B2
(45) Date of Patent: Jul. 8, 2008

(54) IMAGE GENERATING METHOD AND IMAGE GENERATING APPARATUS

(75) Inventor: Masaaki Oka, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 730 days.

(21) Appl. No.: 10/753,922

(22) Filed: Jan. 7, 2004

(65) Prior Publication Data

US 2004/0193288 A1   Sep. 30, 2004

(30) Foreign Application Priority Data

Jan. 7, 2003   (JP) ............................. 2003-001327

(51) Int. Cl.
  *G06K 9/32* (2006.01)
(52) U.S. Cl. .................. 382/298; 345/159; 345/581; 345/660; 345/667
(58) Field of Classification Search .......... 382/298; 701/28, 214; 345/159, 581, 660, 667
  See application file for complete search history.

(56) References Cited

U.S. PATENT DOCUMENTS

| 6,323,878 | B1* | 11/2001 | Haffey et al. ............... 345/660 |
| 6,339,434 | B1* | 1/2002 | West et al. .................. 345/667 |
| 6,747,680 | B1* | 6/2004 | Igarashi et al. .............. 715/784 |

FOREIGN PATENT DOCUMENTS

| EP | 0 678 731 A | 10/1995 |
| FR | 2 809 855 A | 12/2001 |
| JP | 7-282396 | 10/1975 |
| JP | 63-71879 | 4/1988 |
| JP | 63-148378 | 6/1988 |
| JP | 63-187288 | 8/1988 |
| JP | 8-44996 | 2/1996 |
| JP | 2002-81953 | 3/2002 |

OTHER PUBLICATIONS

Igarashi T et al: "Speed-Dependent Automatic Zooming for Browsing Large Documents" Uist 00. Proceedings of the 13TH, Annual ACM Symposium on User Interface Software and Technology, San Diego, CA, Nov. 5-8, 2000, ACM Symposium on User Interface Software and Technology, New York, NY : ACM, US, Nov. 5, 2000, pp. 139-148, XP00117160.*

(Continued)

*Primary Examiner*—Bhavesh M. Mehta
*Assistant Examiner*—John B Strege
(74) *Attorney, Agent, or Firm*—Frommer Lawrence & Haug LLP; William S. Frommer

(57) ABSTRACT

A first storage unit is a storage area for storing original images. Inputted to an input unit is an operation instruction from a user. An obtaining identifying unit identifies an optimal original image pair. An obtaining processing unit accesses the first storage unit to obtain the optimal original image pair. A converting unit converts scales of respective images included in the optimal original image pair into a designated scale to generate intermediate images. A corresponding point matching unit makes the corresponding areas of the intermediate images coincide. A combining unit combines the intermediate images using a predetermined ratio to generate a target image. The resultant target image is outputted from an output unit to a monitor.

7 Claims, 22 Drawing Sheets

OTHER PUBLICATIONS

Igarashi T et al: "Speed-Dependent Automatic Zooming for Browsing Large Documents" Uist 00. Proceedings of the 13th, Annual ACM Symposium on User Interface Software and Technology, San Diego, CA, Nov. 5-58, 2000, ACM Symposiym on User Interface Software and Technology, New York, NY: ACM, US, Nov. 5, 2000, pp. 139-148, XP001171601.

Tan D S et al. Association for Computing Machinery: "Exploring 3D Navigation: Combining Speed-Coupled Flying With Orbiting" CHI 2001 Conference Proceedings, Conference on Human Factors in Computing Systems, Seattle, WA, Mar. 31- Apr. 5, 2001, CHI Conference Proceedings, Human Factors in Computing Systems, New York, NY: IEEE, US, Mar. 31, 2001, pp. 418-425, XP001090391 ISBN: 1-58113-327-8.

Ware C et al: Integrating flying and fish tank metaphors with cyclopean scale: Computer Graphics International, 1997, Proceedings Hasselt and Diepenbeek, Belgium Jun. 23-27, 1997, Los Alamitos, CA, USA, IEEE Comput. Soc, US, Jun. 23, 1997, pp. 39-46, XP010232301.

Cecconi A. and Galanda M.: "adaptive zooming in web cartography" SVG Open Carto. Net Developers 2002 Conference, 'Online! Jul. 15, 2002, XP002301472 Zurich Switzerland Retrieved from the Internet: URI http://www svgopen org/2002/abstractlist_byauthor html> retrieved on Oct. 15!, 2004 section 3.4.

Reinhardt R., Lentz W.: "flash 5 bible" 2001, Hungry Minds, New York USA, XP002290919 p. 304, section shape tweening:— p. 312, end of page.

Lowe, J. W. : "Advanced Internet Map Server Techniques: Designing Intuitive Websites for a Non-Technical User Base" Mar. 13, 2002, XP002290920 Retrieved from the Internet: URI http://www giswebsite com/Ike/reft/P5982P598 HTM> retrieved on Jul. 28, 2004 section"programmatic Cartographic techniques to increase map continuity between scales".

Lowe, J. W.: "Advanced Internet Map Server Techniques: Designing Intuitive Websites for a Non-technical User Base" Mar. 13, 2002, XP002290921 Retrieved from the Internet: URL http://web archive org/web/20020313120421/www giswebsite.com/P598 HTM> retrieved on Jul. 28, 2004!.

Seitz S M et al: "View Morphing" Computer Graphics Proceedings 1996 (Siggraph), New Orleans, Aug. 4-9, 1996, Computer Graphics Proceedings (Siggraph), New York, NY ACM, US, Aug. 4, 1996, pp. 21-30, XP000682718 p. 23, section 3-p. 25, right column, line 43 p. 23; figure 3.

Hornb K., K., Bederson, B., & Plaisant, C.: "Navigation Patterns and Usability of Zoomable User Interfaces with and without an overview" ACM Transactions on Computer-Human Interaction, vol. 9, No. 4, Dec. 2002, pp. 362-388, XP002290918 p. 369, section 3.4-p. 372, line 18 p. 379, section 4.4.1—p. 380, line 8.

Dollner J. and Kersting O,: "Dynamic 3D maps as visual interfaces for spatio-temporal data" Proceedings of the Eighth ACM International Symposium on Advances in Geographic Information Systems, 2000, pp. 115-120, XP002291103 Washington DC, USA p. 118, section 4—p. 119, right column, line 15.

Sun X et al: "A Method for the Synthesis of Intermediate Views in Image-Based Rendering Using Image Rectification" IEEE Canadian Conference on Electrical and Computer Engineering, CCECE 2002, Winnipeg, Maniroba, Canada, May 12-15, 2002, Canadian Conference on Electrical and Computer Engineering, New York, NY: IEEE, US, vol. 2 of 3, May 12, 2002, pp. 991-994, xp001134804 ISBN: 0-7803-7514-9 whole document.

* cited by examiner

FIG.5

| LINE NUMBER | SCALE | DATA START POINT | DATA END POINT | ADDRESS |
|---|---|---|---|---|
| 0 | $10^{-7}$ | (0, 0) | (999999999, 999999999) | 0 |
| 1 | $10^{-6}$ | (0, 0) | (999999999, 999999999) | 1 |
| 2 | $10^{-5}$ | (0, 0) | (999999999, 999999999) | 2 |
| 3 | $10^{-4}$ | (0, 0) | (99999, 99999) | 3 |
| 4 | $10^{-4}$ | (100000, 100000) | (199999, 199999) | 4 |
| 5 | $10^{-4}$ | (10000000, 10000000) | (100000000, 100000000) | 5 |
| ... | ... | ... | ... | ... |
| 998 | $10^{-3}$ | (10000000, 1000000) | (100000000, 10000000) | 3E6 |
| 999 | $10^{-3}$ | (10000000, 10000000) | (100000000, 100000000) | 3E7 |
| EOF | | | | |

FIG. 9A

| LINE SCALE | DATA START POINT | DATA END POINT | ADDRESS |
|---|---|---|---|
| 0 | $10^{-7}$ | (0, 0) | (999999999, 999999999) | 0 |
| 1 | $10^{-6}$ | (0, 0) | (999999999, 999999999) | 1 |
| 2 | $10^{-5}$ | (0, 0) | (999999999, 999999999) | 2 |

FIG. 9B

| LINE SCALE | DATA START POINT | DATA END POINT | ADDRESS |
|---|---|---|---|
| 0 | $10^{-4}$ | (0, 0) | (99999, 99999) | 0 |
| 1 | $10^{-4}$ | (100000, 100000) | (199999, 199999) | 1 |
| 2 | $10^{-4}$ | (10000000, 10000000) | (100000000, 100000000) | 2 |
| 995 | $10^{-3}$ | (1000000, 1000000) | (10000000, 10000000) | 3E3 |
| 996 | $10^{-3}$ | (10000000, 10000000) | (100000000, 100000000) | 3E4 |

| LINE | SCALE | DATA START POINT | DATA END POINT | ID |
|---|---|---|---|---|
| 0 | $10^{-4}$ | (100, 0) | (1000, 1000) | U |
| 1 | $10^{-4}$ | (10000, 1000) | (11000, 11000) | U |
| 2 | $10^{-4}$ | (80000, 100000) | (89000, 150000) | D |
| 3 | $10^{-4}$ | (100000, 500) | (100100, 1000) | U |
| 4 | $10^{-4}$ | (100000, 100000) | (150000, 105000) | U |
| 5 | $10^{-4}$ | (200000, 150000) | (250000, 200000) | D |
| 498 | $10^{-4}$ | (999000000, 99000) | (99910000, 100000) | U |
| 499 | $10^{-4}$ | (999000900, 1000) | (99910000, 2000) | U |
| EOF | | | | |

IMAGE GENERATING METHOD AND IMAGE GENERATING APPARATUS

BACKGROUND OF THE INVENTION

1. Field of the Invention

The present invention relates to an image generating technique and, more particularly, to an image generating method and image generating apparatus operated on the basis of combining a plurality of images.

2. Description of the Related Art

Techniques for displaying a digitized map image on a display apparatus have been known in the form of software for PCs or Internet services. Map images are generally prepared for a plurality of discrete scales so that one of the plurality of map images is displayed at a desired point of time.

When a scale is changed and a map image displayed on a display apparatus is changed accordingly, a user may lose sight of an object that the user had paid attention to or it may take a substantial time for the user to understand the currently displayed area. From these points of view, when the scale of a map image is changed, the displayed map image is desirably switched from one to another smoothly.

Smooth switching between displayed images is required not only in the case of digitized map images but also in the case of drawing a landscape in applications such as games. In games, three-dimensional data of objects are prepared in advance. An image is re-rendered in accordance with a change in the magnification of image to be displayed and the position of point of view, so that smooth image changing or switching can be realized. The volume of calculation required for the re-rendering may be significantly increased depending on the degree of movement of point of view, the number of objects to be displayed and the degree of complexity thereof. Further, there may arise a problem about the size of capacity of memory for storing three-dimensional data of a large number of objects. Accordingly, for CG images in general, including those used for games, smooth changing between images requires further technical improvement.

SUMMARY OF THE INVENTION

The present invention was developed in light of the above circumstances and an object thereof is to provide a technique for changing a currently displayed image smoothly.

A preferred embodiment according to the present invention relates to an image generating apparatus. This apparatus comprises: a first input unit to which a predetermined parameter value related to an image to be displayed is inputted, a second input unit to which a plurality of original images with respective parameters defined therefor are inputted and an image generating unit for performing a predetermined converting process upon the plurality of original images in order to generate intermediate images from the plurality of original images such that the parameter values of the plurality of original images match each other, for combining the plurality of intermediate images thus generated such that their corresponding areas are made to overlap, and for outputting a final combined image. According to this configuration, the image generating unit performs a processing such that the parameter value of the final image matches the parameter value inputted with respect to the image to be displayed.

Examples of the Parameter Include 1. a parameter about the size of image to be displayed such as a scale of an image,
2. a parameter about a space that should be included in the image to be displayed such as a position of point of view of an image, a direction of sight line or an angle of view,
3. a parameter about the appearance of image to be displayed such as the average of colors of pixels constituting the image and the amount of high frequency component included in the image, and
4. a parameter about the time for the image to be displayed such as the time when the image was shot. The parameter may be any attribute that affects the contents of image to be displayed. The parameter may relate to a two-dimensional image or may be referred to when the two dimensional image is generated from a three dimensional space.

The image generating unit may increase the weight of an intermediate image generated from an original image with a corresponding degree of approximation, in terms of its parameter, to the image to be displayed. Further, the image generating unit may mix a plurality of intermediate images so that the resultant image is displayed in an intermediate manner with respect to a detail level of information. In this case, display is possible in which an object is gradually made to appear or disappear in accordance with a change in the parameter value.

Another preferred embodiment according to the present invention relates to an image generating apparatus. This apparatus comprises: an input unit receiving an instruction about a range of an image to be displayed on the screen and an updating unit for updating, moment to moment, the displayed contents so that, when the range is successively shifted and the size of the range is changed concurrently with the movement, an on-screen movement speed of an image currently displayed on the screen is maintained. "The instruction about the range of image" includes not only an instruction about the size of the range but also an instruction about a shift of the range. Further, a combination of instructions may be included.

Still another preferred embodiment according to the present invention relates to an image generating method. This method comprises: preparing in advance a plurality of original images with different detail levels of information and performing a processing so that, when a target image is generated by combining the original images, information included in an original image with a higher detail level of information is presented in the target image. In combining the original images, the plurality of original images may be aligned in position in advance.

"The detail level" may be defined for the configuration of object included in an image, the number of represented colors in the image, the presence or absence of text data attached to the object or the contents of the text data. "Presenting of information in a target image" is realized by various methods such as by displaying 100% of the information, displaying the information with relatively lighter shades depending on a relative weight in the combination or displaying the information with a constant shade or color regardless of the relative weight in the combination.

Still another preferred embodiment according to the present invention relates to an image generating method. This method comprises: performing a rendering processing such that, when an object is moved in a virtual space, an apparent on-screen speed at which the object is moved is maintained without being affected by a change in a manner of display of the object such as a change in scale.

It is to be noted that any arbitrary combination of the above-described structural components and expressions changed between a method, an apparatus, a system, a recording medium, a computer program and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

FIG. 5 shows a structure of a file listing information of an original image stored in a first storage unit according to the apparatus illustrated in FIG. 1.

FIGS. 9A and 9B are diagrams respectively illustrating structures of files listing information of original images according to the apparatus illustrated in FIG. 8.

DETAILED DESCRIPTION OF THE INVENTION

Figure 1:
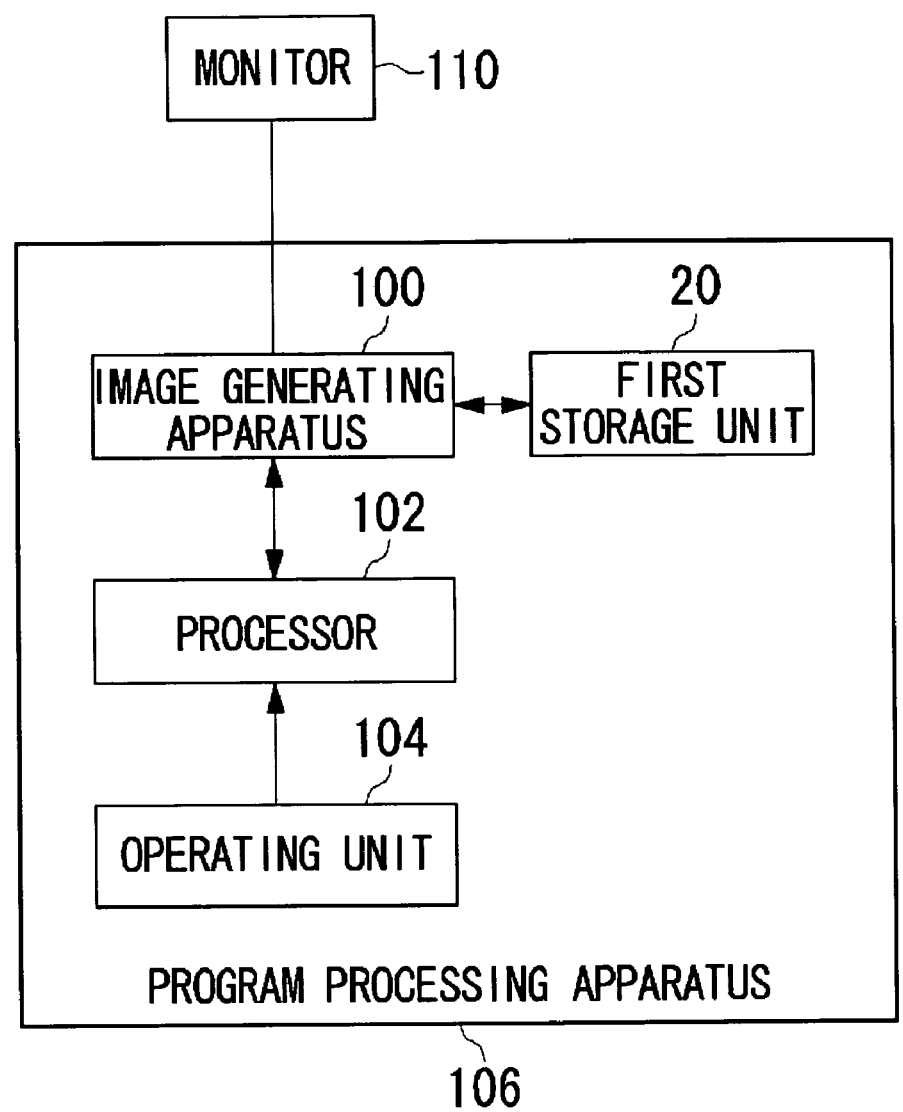
FIG. 1 is a diagram illustrating an aspect of a program processing apparatus according to a first embodiment.

The invention will now be described based on the following embodiments which do not intend to limit the scope of the present invention but exemplify the invention. All of the features and the combinations thereof described in the embodiments are not necessarily essential to the invention.

First Embodiment

In this embodiment, when a map image displayed on a display apparatus is moved by instructions from a user such as those for moving or scrolling the background of object manipulated by the user, an image generating apparatus of this embodiment generates a map image that has a scale changed in accordance with a moving speed (hereinafter, a scale determined by a user's operation will be referred to as "a designated scale" and a map image displayed with the designated scale will be referred to as "a target image"). In this embodiment, a description is given of generation of a target image in particular. Although the designated scale may be of any value, the variety of images prepared in advance as map images (which hereinafter will be referred to as "original images") is generally limited to those corresponding to discrete scales such as 1/1000 and 1/5000. For example, when the designated scale of the target image is 1/2000, neither of the aforementioned original images serves the purpose of displaying the target image. Thus, the image generating apparatus of this embodiment is provided with the following functions in respect of generation of a target image.

1. A target image with an arbitrary designated scale is generated from a plurality of limited original images while taking an image quality and an information display function into consideration.
2. Even if the scale of a target image once displayed is changed, a new target image is smoothly generated and then displayed.

The number of original images is limited, however it is ensured that a plurality of them remains available. Accordingly, in order to generate a target image, appropriate original images must be selected. An original image having a scale which approximates the scale of target image and is larger than the same and an original image having a scale which is smaller than the scale of target image are selected herein. These two original images constitute "an optimal original image pair". This term indicates the respective original images included in the pair. Scales of images of the optimal original image pair are first made to coincide with a designated scale. Then, the images are combined. As a result of combining, a target image is obtained.

When images are combined, a point or area which is common to an optimal original image pair such as the same building is made to overlap and the original image with a higher degree of approximation to the designated scale is assigned a larger weight. Because of this weighting, when a target image makes a transition from an original image with a relatively smaller scale to an original image with a larger scale due to a change in the designated scale, the building shown only in the image with the larger scale is made to appear gradually.

In this way, a target image is generated. Thereafter, if the designated scale or a place of interest to a user is changed, a target image is re-generated from an optimal original image pair and then displayed. As a result, even if original images are provided discretely, smooth image switching is realized.

An "image" generally indicates the contents displayed on a display apparatus. In this embodiment, the term may inclusively indicate, in addition to an image which is displayed as a map, a significantly large area of an entire image potentially displayed as a map. In the case that the term "image" indicates the entire image, this image is not displayed as it is. Parameters such as a portion of the image that should be actually displayed and a scale should be determined before the image is displayed on the display apparatus. Whether the term "image" is used to mean an image displayed or an image in the latter meaning will not be clearly mentioned hereinafter unless discrimination is required.

In order to perform a converting processing to be described later on an image, an orthogonal coordinate system is defined. This coordinate system may include, e.g., latitude and longitude, and is uniquely defined for an actual land, which is an object to be displayed in the form of a map. When a map is drawn by partitioning the land, coordinates determined by the absolute coordinate system are defined. For example, it is assumed that Tokyo Station is at the origin of coordinate (0, 0) and Shinjuku Station is represented as (a, b). In any image utilized in this embodiment including Tokyo Station, the coordinate of that point within the image, i.e., Tokyo Station, is always (0, 0). Similarly, the coordinate of a point in an image including Shinjuku Station is always (a, b). Thus, the coordinate defined in an image is determined regardless of a scale.

A scale is determined by a ratio of a distance between two points displayed on a display apparatus with respect to a distance between the two points on an actual land. For example, when the actual distance between "Tokyo Station" and "Shinjuku Station" is 10 km and the distance between them when displayed on a display apparatus is 10 cm, the scale of a displayed image is determined as 1/100000. According to this embodiment, unlike paper maps, the scale depends on display apparatus. For simplicity of description, the scale will be calculated hereinafter assuming that an image is displayed in a square area of 10 cm×10 cm regardless of display apparatus. The square area will hereinafter be referred to as "a display window". When the size or configuration of an area where an image is displayed is actually different from one display unit to another, a state in which a known linear conversion is performed upon the display window may be considered. Such a state will not be described in detail.

In a display apparatus, a display window is defined by arranging a plurality of pixels. The arrangement of pixels inherently depends on display apparatus. For simplicity of description, the number of pixels 400×400 is assumed in this embodiment.

An image which is actually displayed on a display window, i.e., a target image is determined by designation of a range in an original image as well as by a scale. Thus, a designation from a user is awaited. The range determined by the user's designation will be referred to as "the range of target image".

In accordance with this embodiment, images constituting an optimal original image pair are subject to scale conversion so that two intermediate images with respective scales matching a designated scale are generated. These intermediate images have the same scale. Nevertheless, the finer the detail level of an original image, the finer the detail level of the intermediate image generated from the original image. An intermediate image with a finer detail will be referred to as "a detailed image" and the other image will be referred to as "a simple image" hereinafter, in spite of the identical scale.

Figure 2:
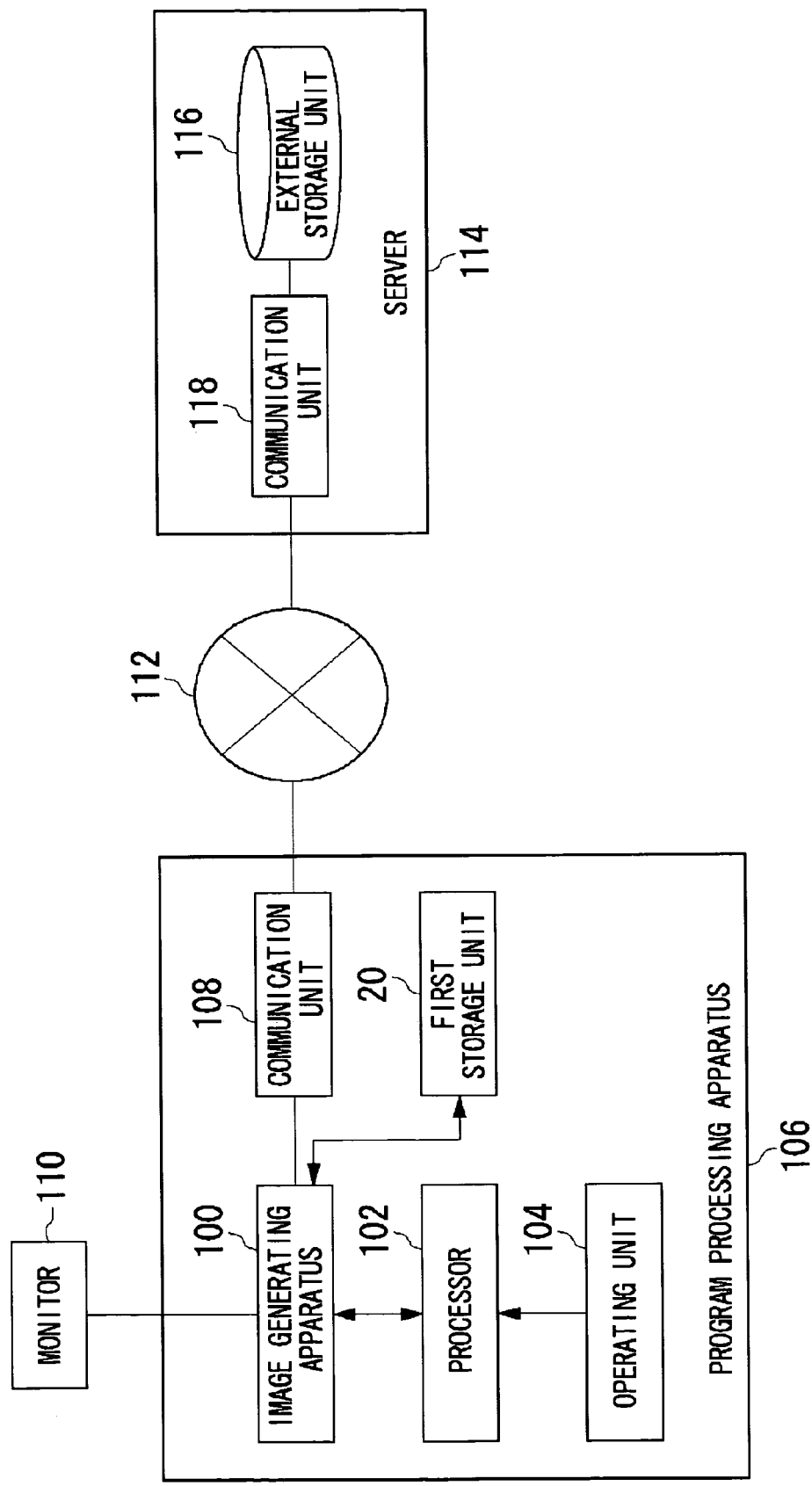
FIG. 2 is a diagram illustrating another aspect of the program processing apparatus according to the first embodiment.

FIGS. 1 and 2 illustrate different aspects of a program processing apparatus 106 according to the first embodiment. According to both aspects, the unit comprises an operating unit 104, a processor 102, an image generating apparatus 100 and a monitor 110. The operating unit 104 is an interface such as a button for a user to input predetermined operation instructions. The predetermined operation instructions include instructions about direction and speed that the range of target image is shifted. For example, the instructions may shift the range of target image in the east direction with a higher movement speed than a current movement speed.

The processor 102 carries out a program for displaying a map, in order to determine the coordinate placed at the center of the display window, from an instruction about the movement of the range of target image. The image generating apparatus 100 determines the range of a new target image and a designated scale on the basis of the instruction about movement of the range of target image and the coordinate outputted from the processor 102, so as to generate a target image. The target image is displayed on a display window in the monitor 110.

Referring to the example in FIG. 1, an original image is stored in a first storage unit 20 in the program processing apparatus 106. In accordance with the example in FIG. 2, unlike FIG. 1, an original image is also stored in an external storage unit 116 in a server 114 placed outside the program processing apparatus 106. In the example shown in FIG. 2, the image generating apparatus 100 accesses via a network 112 the external storage unit 116 when an original image is required. The image generating apparatus 100 illustrated in FIG. 1 generally accesses an original image at higher speed than the image generating apparatus 100 illustrated in FIG. 2. Nevertheless, the image generating apparatus 100 illustrated in FIG. 2 can make an area for storage of original images in the program processing apparatus 106 smaller than that of the image generating apparatus 100 illustrated in FIG. 1.

Figure 3:
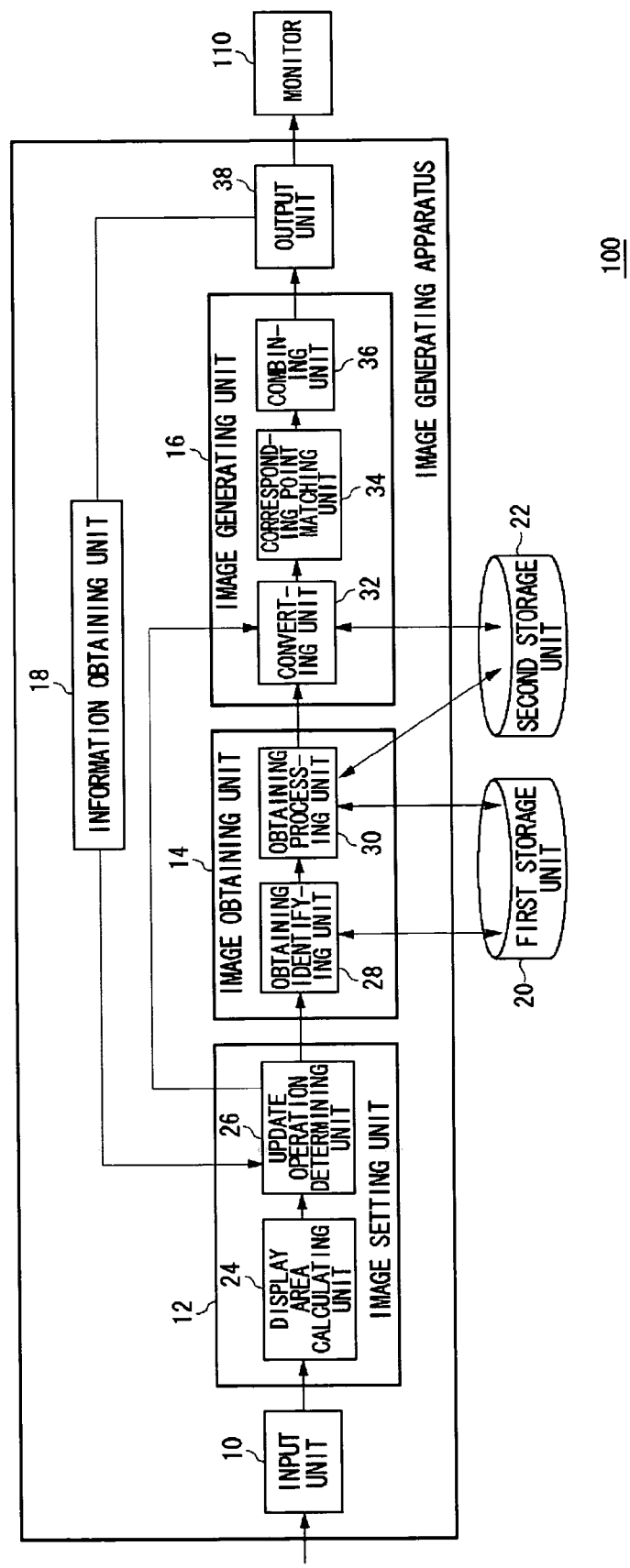
FIG. 3 shows a structure of an image generating apparatus according to the first embodiment.

FIG. 3 shows a structure of the image generating apparatus 100 illustrated in FIG. 1. The image generating apparatus 100 has an input unit 10, an image setting unit 12, an image obtaining unit 14, an image generating unit 16, an output unit 38 and an information obtaining unit 18. Further, the image setting unit 12 includes a display area calculating unit 24 and an update operation determining unit 26. The image obtaining unit 14 includes an obtaining identifying unit 28 and an obtaining processing unit 30. The image generating unit 16 includes a converting unit 32, a corresponding point matching unit 34 and a combining unit 36.

These components can be implemented by hardware such as CPUs for any computers, memories and other LSIs, or software such as programs loaded in memories. Functional blocks implemented by cooperation of such elements are illustrated herein. Accordingly, a person skilled in the art would understand that these functional blocks are realized in a variety of manners such as by hardware, software or a combination of them.

The first storage unit 20 is a storage area for storing original images and is implemented by a hard disk. A second storage unit 22 is a main memory and implemented by a RAM (Random Access Memory) with a higher access speed than that of the first storage unit 20.

Inputted to the input unit 10 is an operation instruction from a user.

The display area calculating unit 24 determines, on the basis of the operation instruction inputted to the input unit 10 by the user, a designated scale and the range of target image.

The obtaining identifying unit 28 identifies an optimal original image pair from the original images stored in the first storage unit 20 on the basis of the designated scale and the coordinate. The obtaining processing unit 30 has an access to the first storage unit 20 in order to store the optimal original image pair in the second storage unit 22 and prepare for subsequent processing.

The converting unit 32 performs a converting processing for changing scales of respective images of the optimal original image pair to the designated scale, so that intermediate images are generated. In this case, it is assumed that one of the images constituting the optimal original image pair is enlarged and the other is reduced.

The corresponding point matching unit 34 ensures that the corresponding areas of the intermediate images coincide. For example, when the coordinate of area showing the same building is different from image to image constituting the optimal original image pair, area-to-area correction including shift, enlargement and reduction is performed so that the corresponding areas overlap.

The combining unit 36 combines the intermediate images subjected to correspondence in the corresponding point matching unit 34 using a predetermined ratio so as to generate a target image with the designated scale. The predetermined ratio is determined so that the original image, in the optimal original image pair, with a scale approximating the designated scale is larger. This can be carried out by α blending. The combining is performed based on, e.g., the following expression:

$$C = \left(1 - \frac{X-1}{M-1}\right)A + \frac{X-1}{M-1}B$$

wherein A indicates data for determining a color at a predetermined position in the intermediate image obtained by conversion from the original image, in the optimal original image pair, with a larger scale. B indicates data for determining a color at a predetermined position in the intermediate image obtained by conversion from the original image, in the optimal original image pair, with a smaller scale. It is assumed that the position of A coincides with the position of B. M indicates a ratio of scales between images included in the optimal original image pair. X indicates a ratio of the scale of the original image including A with respect to the scale of the intermediate image.

The output unit 38 identifies the correspondence between a position, in the coordinate system, in the range of target image and the position of a pixel on the monitor 110 so as to expand the color of the predetermined position in the coordinate system to a pixel value at the corresponding pixel position.

The information obtaining unit 18 feeds information of the optimal original image pair stored in the second storage unit 22 back to the update operation determining unit 26. When the designated scale is updated in the display area calculating unit 24, the update operation determining unit 26 determines whether the optimal original image pair stored in the second storage unit 22 can be used to generate a new target image.

Figure 4A:
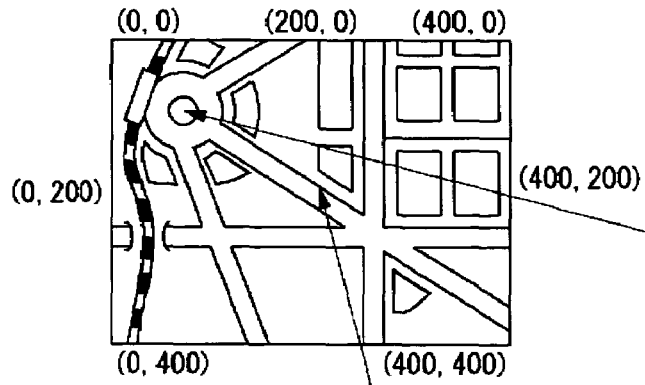
FIGS. 4A through 4E show generation of a target image according to the apparatus illustrated in FIG. 1.
Figure 4B:
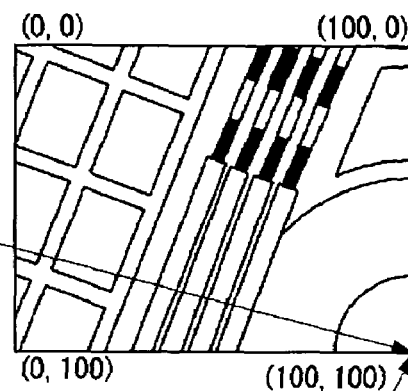
Figure 4C:
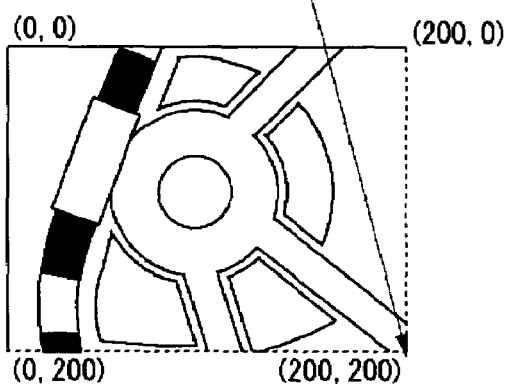
Figure 4D:
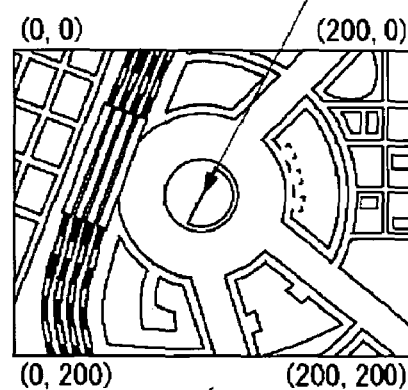

FIGS. 4A through 4E show original images, intermediate images and a target image when the image generating unit 16 generates the target image from an optimal original image pair. These images are displayed on the same display window. FIGS. 4A and 4B will be described first. FIGS. 4A and 4B show the correspondence between coordinates when original images with different scales are displayed on the same display window. The range covered by the coordinates of the image illustrated in FIG. 4A is 16 times as large as that of the image illustrated in FIG. 4B. Since FIGS. 4A and 4B are defined by an absolute coordinate system in spite of the different scales, the same object indicated by arrow has the same coordinate (100, 100). The detail level of FIG. 4B is higher than that of FIG. 4A. Different detail levels are assigned in accordance with the scales of prepared original images. Specifically, an original image with a larger scale has a higher detail level.

FIG. 5 shows a file indicating information of original images stored in the first storage unit 20. The file lists the address in the first storage unit 20 indicating the location of an original image prepared for a corresponding one of a plurality of scales. A data start point and a data end point are respectively upper left and lower right coordinates in the range of coordinates included in the original image. When gaining access to the first storage unit 20, the image identifying unit 28 and the obtaining processing unit 30 first refer to this file and perform the respective processing.

Figure 6:
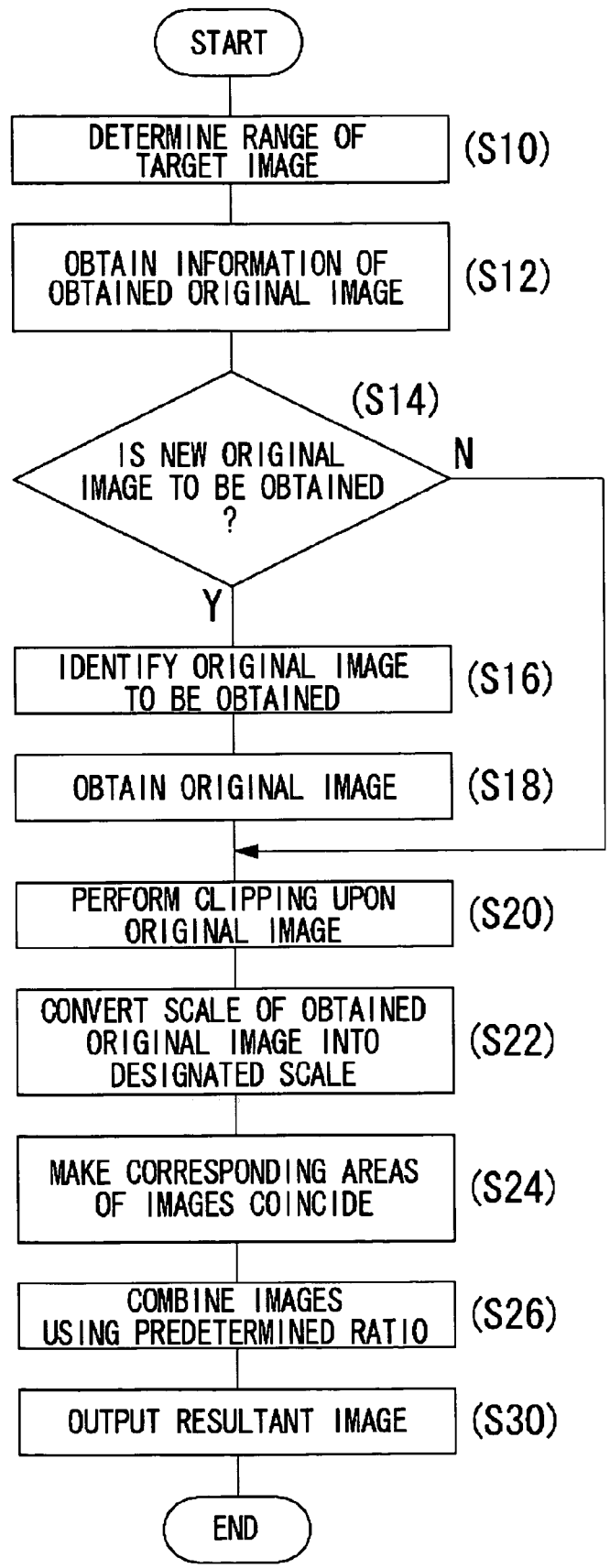
FIG. 6 is a flowchart of processing for generating a target image according to the apparatus illustrated in FIG. 1.
Figure 7A:
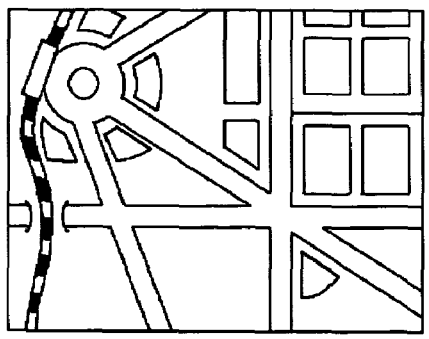
FIGS. 7A through 7E show generation of a target image according to the apparatus illustrated in FIG. 1.
Figure 7B:
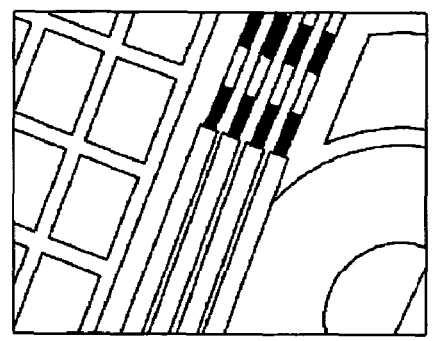
Figure 7C:
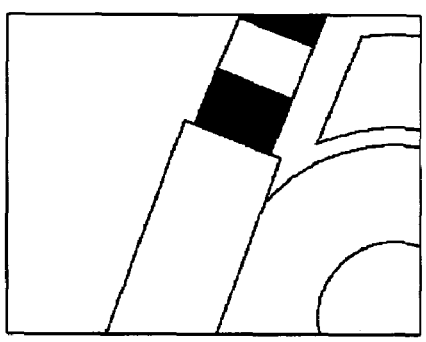
Figure 7D:
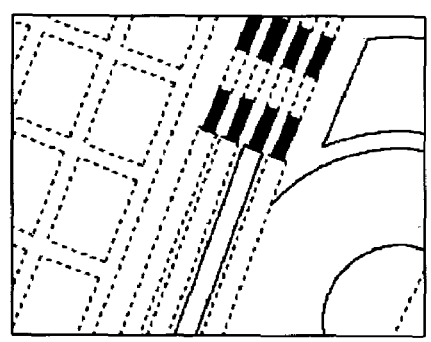
Figure 7E:
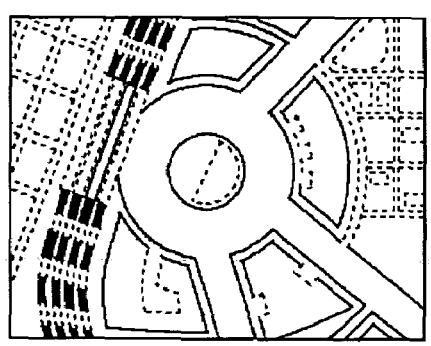

FIG. 6 shows a procedure for generating a target image by the image generating apparatus 100. The display area calculating unit 24 illustrated in FIG. 3 determines the range of a target image based on an operation instruction inputted to the input unit 10 by a user (S10). In the case that target images have been already generated, the update operation determining unit 26 obtains, from the information obtaining unit 18, information of an optimal original image pair already obtained (S12). If a new optimal original image pair is required in order to generate a new target image (Y in S14), the obtaining identifying unit 28 identifies an optimal original image pair (S16) and the obtaining processing unit 30 stores the identified optimal original image pair from the first storage unit 20 in the second storage unit (S18). If a new optimal original image pair is not required (N in S14), the optimal original image pair already obtained is used. The converting unit 32 performs clipping upon images of the optimal original image pair at the same coordinates as the range of target image (S20). Further, conversion is performed for enlarging and reducing the images of the optimal original image pair so that their scales match the designated scale (S22). As a result, intermediate images are generated. The corresponding point matching unit 34 corrects the intermediate images so that the corresponding areas of the intermediate images coincide, i.e., overlap (S24). The combining unit 36 combines the intermediate images using a predetermined ratio to generate a target image (S26). The generated target image is outputted from the output unit 38 (S30) and displayed on a display window on the monitor 110.

Returning to FIGS. 4A through 4E, FIGS. 4A and 4B show the optimal original image pair as described above. When an instruction is given to reduce the coordinate range of the image illustrated in FIG. 4A by ¼, the converting unit 32 illustrated in FIG. 3 generates the intermediate image illustrated in FIG. 4C reduced by ¼ from the coordinate range of the image illustrated in FIG. 4A and the intermediate image illustrated in FIG. 4D enlarged by 4 from the coordinate range of the image illustrated in FIG. 4B.

Figure 4E:
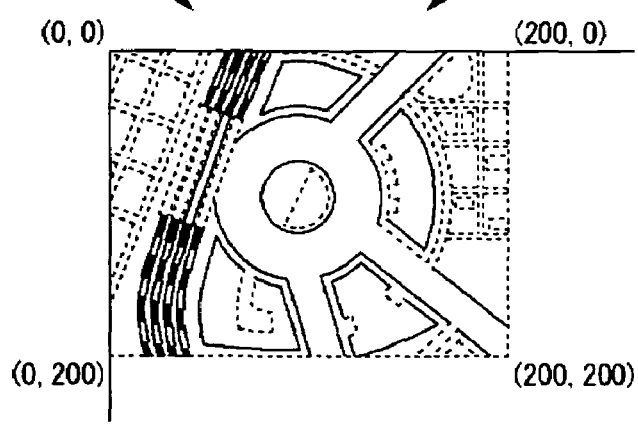

When a user gives an instruction that a designated scale be gradually changed from a scale approximating the scale of the original image shown in FIG. 4A toward a scale approximating the scale of the original image shown in FIG. 4B, the target image is made to transit smoothly from the image of FIG. 4A, through the image of FIG. 4E, and finally to the image of FIG. 4B. Further, buildings that are not illustrated in FIG. 4A are illustrated with relatively lighter shades in FIG. 4E and illustrated clearly in FIG. 4B. By changing the range of target image, the target image is smoothly changed and buildings are made to appear or disappear gradually in accordance with the size of range of the target image. Thus, a user does not lose sight of points of interest to the user before and after the change.

Referring to FIG. 4E, configurations of buildings included only in the image of FIG. 4B with a higher detail level are displayed with relatively lighter shades. Objects other than the configurations of the buildings may be similarly displayed. When a text "Tokyo Station" is displayed only on the original image illustrated in FIG. 4B of the optimal original image pair, the text "Tokyo Station" is displayed with relatively lighter shades in FIG. 4E generated from FIGS. 4A and 4B. Changing the range of target image from FIG. 4A to FIG.

4B enables the text "Tokyo Station" which is not originally displayed to be displayed so as to become gradually clearer.

FIGS. 7A through 7E illustrate original images, intermediate images and a target image when the image generating unit 16 generates the target image from an optimal original image pair by a procedure different from that of FIGS. 4A through 4E. As in FIGS. 4A through 4E, these images are displayed on the same display window. In the procedure for generating a target image illustrated in FIG. 7A through 7E, a converting processing is performed two times, i.e., before and after a combining processing, unlike the procedure for generating a target image illustrated in FIG. 4A through 4E. Images of FIGS. 7A and 7B constitute the optimal original image pair. The converting unit 32 reduces by 1/16 the coordinate range of the image illustrated in FIG. 7A in order to form the image FIG. 7C with the same coordinate range as that of the image illustrated in FIG. 7B. The combining unit 36 weights the images illustrated in FIGS. 7B and 7C by ½ respectively and combines the images, so as to generate the image illustrated in FIG. 7D. Further, the combining unit 36, in an added processing not found in the case of FIGS. 4A through 4E, enlarges the coordinate range of the image illustrated in FIG. 7D four times in order to generate the image illustrated in FIG. 7E.

The operation of the image generating apparatus 100 with the above-described structure is as follows. For example, when a user of a map image application gives an instruction on the movement in the map of Chiyoda Ward and decreases the movement speed near Tokyo Station, the input unit 10 specifies a designated scale which is changed in accordance with a change in the movement speed. The obtaining identifying unit 28 identifies an optimal original image pair including original images respectively illustrating Chiyoda Ward and the neighborhood of Tokyo Station from the first storage unit 20. The obtaining processing unit 30 stores the optimal original image pair from the first storage unit 20 in the second storage unit 22. The converting unit 32 converts scales of images of the optimal original image pair into the designated scale in order to generate intermediate images. The corresponding point matching unit 34 overlaps the corresponding areas of the intermediate images at the same position. The combining unit 36 combines the intermediate images using a predetermined ratio. When the designated scale for generating the target image is further increased, the map of the neighborhood of Tokyo Station is finally displayed.

In accordance with this embodiment, a change in a speed for shifting a target image already displayed enables a correspondingly smooth change in the target image even when the scale is changed. Further, a target image with a detail level different from that of an original image can be generated. Moreover, the scales of original image prepared in advance may be discrete so that reduction in data capacity is realized.

Second Embodiment

In accordance with this embodiment, an image generating apparatus generates a target image from an optimal original image pair by combination described in the first embodiment. According to the second embodiment, an original image in the optimal original image pair having a larger amount of data and a higher detail level is generally stored in an external storage unit. Thus, a storage capacity in a local storage unit that the image generating apparatus has can be reduced. The access time to the external storage unit is considered so that, when an input is provided by a user, the image generating apparatus first subjects to conversion only the scale of original image with a lower detail level in the local storage unit provided in the image generating apparatus and displays the resultant image on a display window. Then, a display on the display window is re-rendered. As a result, a target image generated by combining the original image with a lower detail level and the original image with a higher detail level is displayed on the display window.

Figure 8:
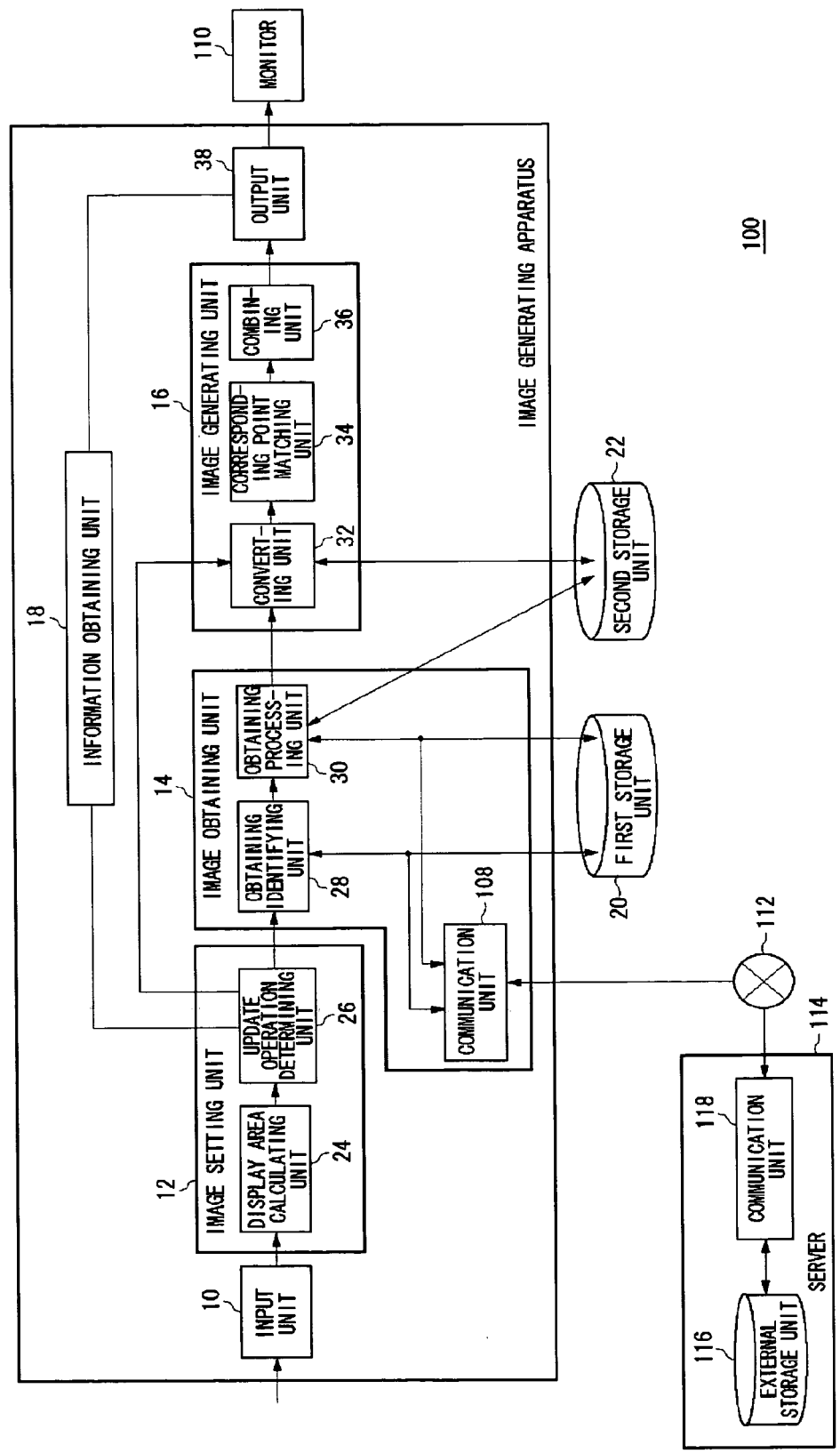
FIG. 8 shows a structure of an image generating apparatus according to a second embodiment.

FIG. 8 shows the structure of an image generating apparatus 100 which is of the same type as that of FIG. 2 and utilized in this embodiment. The image generating apparatus 100 has the input unit 10, the image setting unit 12, the image obtaining unit 14, the image generating unit 16, the output unit 38 and the information obtaining unit 18. The image obtaining unit 14 includes the obtaining identifying unit 28, the obtaining processing unit 30 and a communication unit 108. The image generating apparatus 100 is connected via the network 112 to the server 114. The server 114 has the communication unit 118 and the external storage unit 116. This image generating apparatus is operated in the same manner as the image generating apparatus 100 illustrated in FIG. 3 except for the image obtaining unit 14.

The external storage unit 116 is a storage area in the server 114 and has larger storage capacity than the first storage unit 20.

The obtaining identifying unit 28 identifies an optimal original image pair from original images stored in the first storage unit 20 and the external storage unit 116. In order to access the external storage unit 116, the communication units 108 and 118 are used.

The obtaining processing unit 30 gains access to the first storage unit 20 and the external storage unit 116 to obtain an optimal original image pair. The obtaining processing unit 30 may gain access to the first storage unit 20 and the external storage unit 116 at the same time or may perform sequential access, i.e., gain access first to the first storage unit 20 and then to the external storage unit 116.

FIG. 9A shows a file which indicates information of original images stored in the first storage unit 20. FIG. 9B shows a file which indicates information of original images stored in the external storage unit 116. Although FIGS. 9A and 9B have the same data structure as the file illustrated in FIG. 5, an original image with a smaller scale is stored in FIG. 9A and an original image with a larger scale is stored in FIG. 9B, in accordance with capacity of storage areas of the first storage unit 20 and the external storage unit 116.

Figure 10:
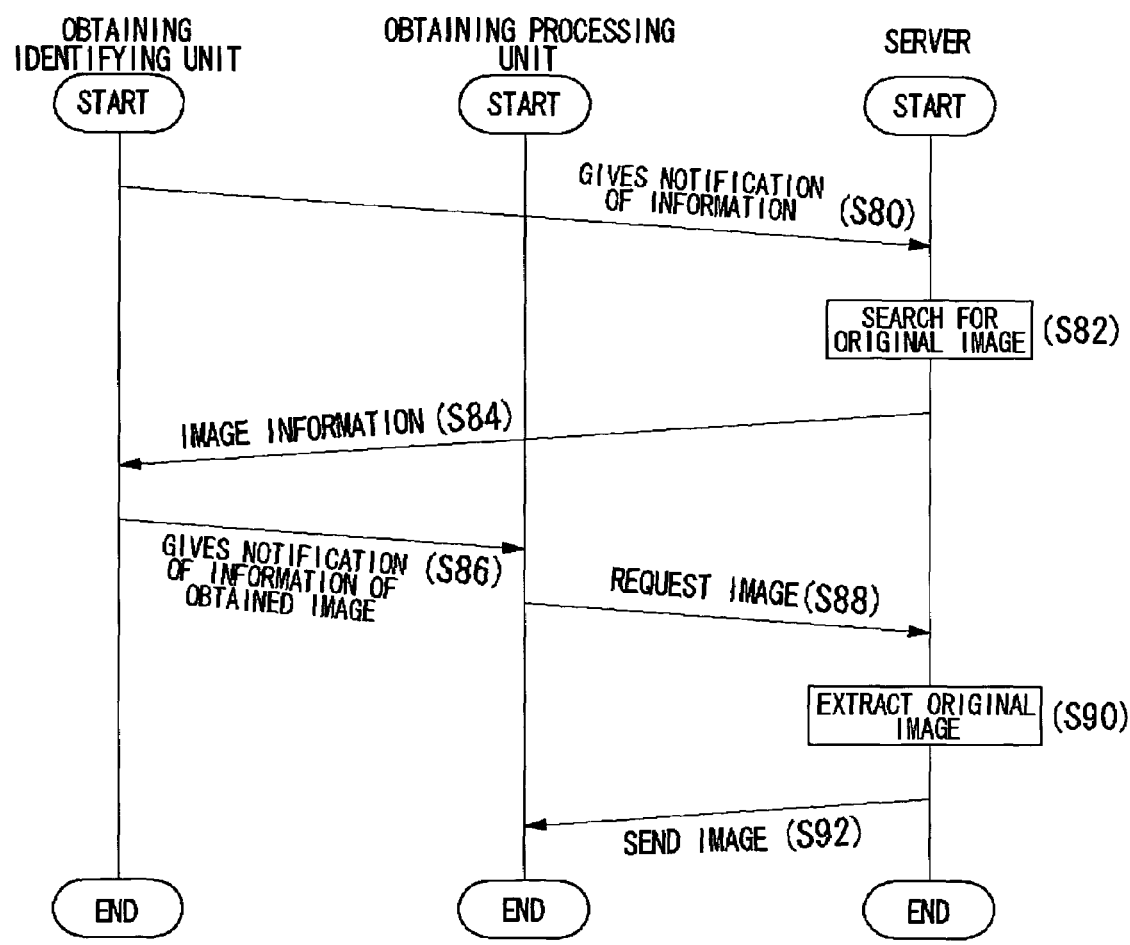
FIG. 10 is a sequence diagram of processing for obtaining an original image according to the apparatus illustrated in FIG. 8.

FIG. 10 shows a procedure for obtaining an original image by the obtaining identifying unit 28, the obtaining processing unit 30 and the server 114. The obtaining identifying unit 28 notifies the server 114 of information such as the range of target image (S80). The server 114 searches for a required original image on the basis of the file illustrated in FIG. 9B (S82), and sends the result to the obtaining identifying unit 28 as image information (S84). The obtaining identifying unit 28 identifies one or both of images of optimal original image pair from this image information and notifies the obtaining processing unit 30 of the result (S86). The obtaining processing unit 30 requests the optimal original image pair from the server 114 (S88). The server 114 retrieves an original image on the basis of its address illustrated in FIG. 9B from the external storage unit 116 (S90), performs clipping upon the original image in the range of target image and sends the result to the obtaining processing unit 30 (S92).

Figure 11:
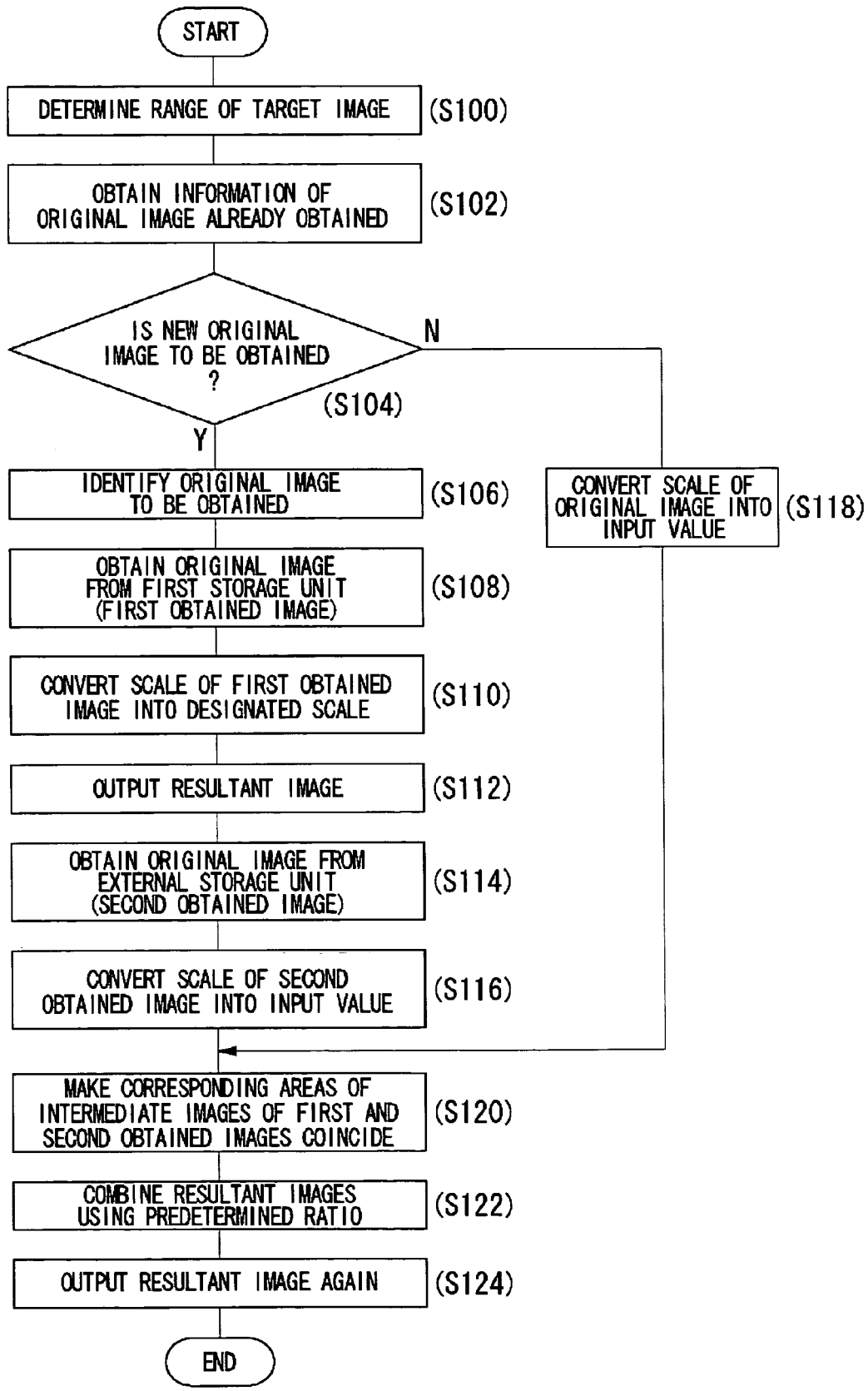
FIG. 11 is a flowchart of processing for generating a target image according to the apparatus illustrated in FIG. 8.

FIG. 11 shows a procedure for progressively displaying a target image by the image generating apparatus 100. The display area calculating unit 24 determines the range of a target image on the basis of the contents inputted in the input unit 10 (S100). If any target image has been generated before, the update operation determining unit 26 obtains information of optimal original image pair already obtained, from the information obtaining unit 18 (S102).

If a new optimal original image pair is required in order to generate a new target image (Y in S104), the obtaining identifying unit 28 identifies an optimal original image pair (S106) and the obtaining processing unit 30 stores one of the identified original images from the first storage unit 20 in the second storage unit 22 (S108). This original image is referred to as a first obtained image. The converting unit 32 converts the scale of the first obtained image into a designated scale (S110) to generate a first intermediate image. The first intermediate image in the range to be displayed is outputted from the output unit 38 (S112) and displayed on a display window for the monitor 110. The obtaining processing unit 30 obtains the other original image identified by the obtaining identifying unit 28 from the external storage unit 116 (S114). The original image thus obtained is referred to as a second obtained image. The converting unit 32 converts the scale of the second obtained image into the designated scale (S116) to generate a second intermediate image. If the corresponding areas of the first and second intermediate images are displaced from each other, the corresponding point matching unit 34 makes the areas coincide (S120). The combining unit 36 combines the first intermediate image with the second intermediate image using a predetermined ratio (S122) to generate the target image. The output unit 38 outputs the target image again (S124) and updates the display on the display window for the monitor 110. On the other hand, if the new optimal original image pair is not required (N in S104), the scale of the optimal original image pair already obtained is converted into the designated scale (S118) and the above-described processing is carried out.

In accordance with this embodiment, the storage capacity of the local storage unit provided in the image generating apparatus 100 is reduced. When an instruction is given by a user, the scale of original image with a lower degree of detail of information locally stored in the local storage unit provided in the image generating apparatus 100 is subject to conversion so that the resultant image is displayed. Thus, when it takes a time to gain access to an external storage unit, initial display is rapidly performed.

Third Embodiment

In accordance with this embodiment, an image generating apparatus obtains, if desired, an original image with a higher level of detail from an external storage unit as in the second embodiment. In this embodiment, an original image is not prepared in advance in the external storage unit. Instead, three dimensional data are stored in the external storage unit. An original image is generated, if desired, on the basis of the three dimensional data by a rendering processing.

Figure 12:
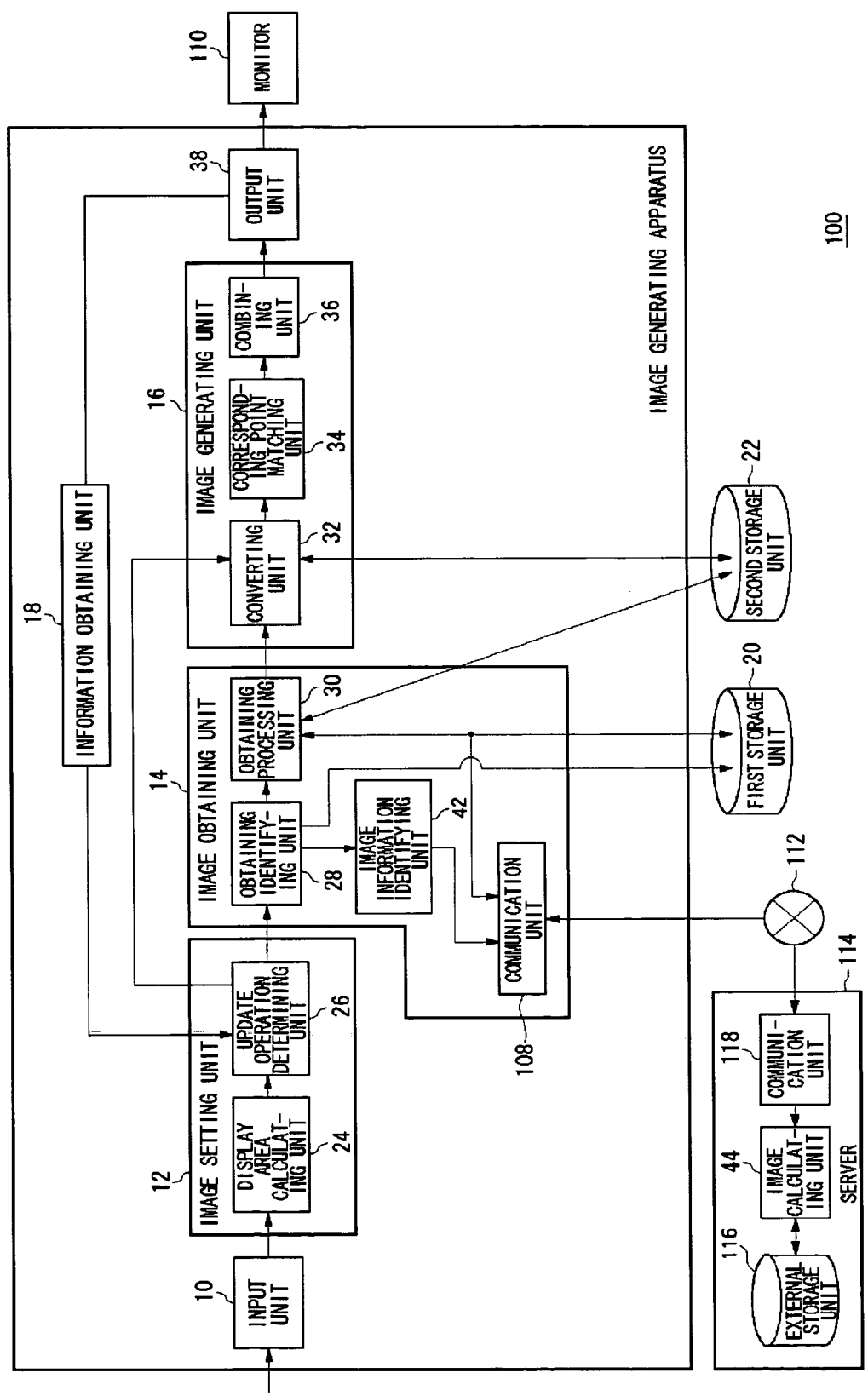
FIG. 12 shows a structure of an image generating apparatus according to a third embodiment.

FIG. 12 shows the structure of an image generating apparatus 100 which is of the same type as that of FIG. 2 and utilized in this embodiment. The image generating apparatus 100 has the input unit 10, the image setting unit 12, the image obtaining unit 14, the image generating unit 16, the output unit 38 and the information obtaining unit 18. The image obtaining unit 14 includes the obtaining identifying unit 28, the obtaining processing unit 30, an image information identifying unit 42 and the communication unit 108. The image generating apparatus 100 is connected via the network 112 to the server 114. The server 114 includes the communication unit 118, the external storage unit 116 and an image calculating unit 44. This image generating apparatus is different from the image generating apparatus 100 illustrated in FIG. 3 in the image obtaining unit 14.

The obtaining identifying unit 28 identifies an optimal original image pair from original images stored in the first storage unit 20 in order to generate a target image with a designated scale. Only original images with a lower detail level of information are stored in the first storage unit 20. If at least one of original images included in the optimal original image pair is not found in the first storage unit 20, the original image must be generated by a rendering processing. In this case, the obtaining identifying unit 28 instructs the image information identifying unit 42 to generate the original image.

The image information identifying unit 42 identifies parameters, such as a position of view point and a direction of sight line, required for generating the original image by the rendering processing in the sever 114.

The image calculating unit 44 performs the rendering processing on the basis of the three dimensional data in the external storage unit 116 to generate the original image identified by the obtaining identifying unit 28. By the obtaining processing unit 30 gaining access to the first storage unit 20 and the server 114, the original image is stored in the second storage unit 22.

According to this embodiment, an original image with a higher detail level of information is externally generated by the rendering processing. Thus, the processing volume in the image generating apparatus is not increased and the storage capacity of the local storage unit provided in the image generating apparatus is reduced.

Only the three dimensional data may be obtained from the server 114 and the rendering processing may be performed in the image generating apparatus 100 to generate an original image.

Fourth Embodiment

This embodiment is a variation of the first embodiment in that generation of a target image in the first embodiment is modified and a landscape image in a direction of sight line designated by a user of a game (which is also referred to as "a designated direction") is displayed on a display unit (the landscape image displayed in the designated direction is referred to as "a target image" hereinafter in this embodiment). The designated direction may be set as desired. Nevertheless, instead of performing a rendering processing every time a designation is provided, the variety of landscape images generated based on three dimensional data by the rendering processing (which hereinafter will be referred to as "an original image" in this embodiment) is limited to those of directions indicated by discrete angles such as 10°, 20° and 30°, in order to reduce the amount of calculation in the rendering processing. For example, when the designated direction is 45°, the aforementioned original image does not meet the purpose of displaying at this angle. An image generating apparatus according to this embodiment generates a plurality of original images of directions indicated by discrete angles with respect to an arbitrary designated direction, converts directions of sight line used to generate the original images into the designated direction and then combines the resultant images in order to generate a target image. Even when the designated direction is successively changed, the target image is changed smoothly. Although rendering requires information such as an angle of view as well as a direction of sight line, the angle of view is set to be fixed for convenience of explanation.

Although restricted in number, there are a plurality of directions of sight line for the rendering processing. Among such directions, a direction of sight line suitable for generating a target image must be selected. Two directions that approximate the designated direction and sandwich the same are selected herein. These two directions will constitute "an optimal direction pair", and two original images generated by the rendering processing for the optimal direction pair will constitute "an optimal original image pair". These terms indicate respectively the directions and original images included in the pairs. Images are shifted so that the direction of the optimal original image pair coincides with the designated direction before the images are combined. As the result of combining, a target image is obtained.

When combining the images, a point or area which is common to an optimal original image pair such as the same building is made to overlap and an original image in a direction with a higher degree of approximation to the designated direction is assigned a larger weight. Since a target image is generated as described above, even if the designated direction is successively changed, smooth switching between images is realized without performing a rendering processing every time the designated direction is changed.

Figure 13:
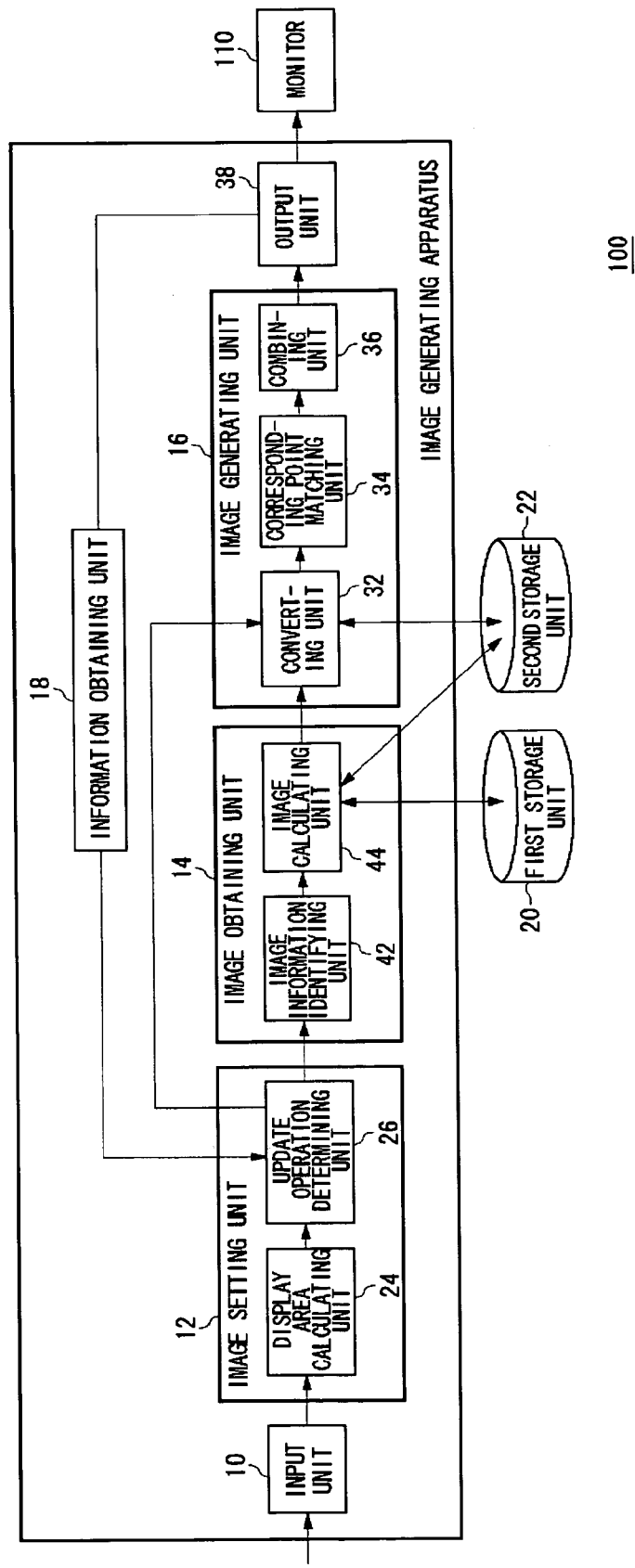
FIG. 13 shows a structure of an image generating apparatus according to a fourth embodiment.

FIG. 13 shows the structure of an image generating apparatus 100 which is of the same type as that of FIG. 1 and utilized in this embodiment. The image generating apparatus 100 has the input unit 10, the image setting unit 12, the image obtaining unit 14, the image generating unit 16, the output unit 38 and the information obtaining unit 18. The image obtaining unit 14 includes the image information identifying unit 42 and the image calculating unit 44. This image generating apparatus 100 is different from the image generating apparatus illustrated in FIG. 3 in the image obtaining unit 14.

Although the first storage unit 20 is a storage area which is the same as the first storage unit 20 illustrated in FIG. 1, it stores three dimensional data. The three dimensional data includes data about an object configuration.

Inputted to the input unit 10 is a designated direction by a user's operation instruction. The designated direction is indicated by angles $\theta$ and $\phi$. When a point of view is placed at the origin of a world coordinate and the designated direction is indicated by a vector from the origin (which hereinafter will be referred to as "a sight line vector"), the angle $\theta$ is an angle formed by the sight line vector and the z axis of an orthogonal coordinate. The angle $\phi$ is an angle formed by a vector in the designated direction projected on the x-y plane in the world coordinate system and the x axis. For simplicity of explanation, it is assumed that the angle $\theta$ is fixed to 90° and only the angle $\phi$ is variable hereinafter. In other words, we assume that a line of view is horizontal. This assumption is introduced for the direction of sight line as well as for the designated direction.

The image information identifying unit 42 identifies an optimal direction pair for generating a target image from a set of predetermined discrete angle values of direction of sight line.

The image calculating unit 44 performs a rendering processing upon the three dimensional data in the first storage unit 20 with respect to the optimal direction pair to generate an optimal original image pair. Further, the absolute distance between the position of a predetermined object displayed on an original image and the position of point of view in the world coordinate system is calculated in order to use in the converting unit 32 to be described later. The absolute distance between the position of the predetermined object and the position of point of view serves as a turning radius when shifting the image and thus will be also referred to as "a turning radius".

The converting unit 32 horizontally moves the respective images of the optimal original image pair by a distance obtained by multiplying the angle formed by the direction of sight line and the designated direction by a turning radius, in order to match the direction of sight line of the original images with the designated direction. As a result of this, the intermediate image is generated.

The corresponding point matching unit 34 makes the corresponding areas of the intermediate images coincide. The corresponding area is identified by the coordinate of an object taken into the intermediate images on the world coordinate system.

Figure 14:
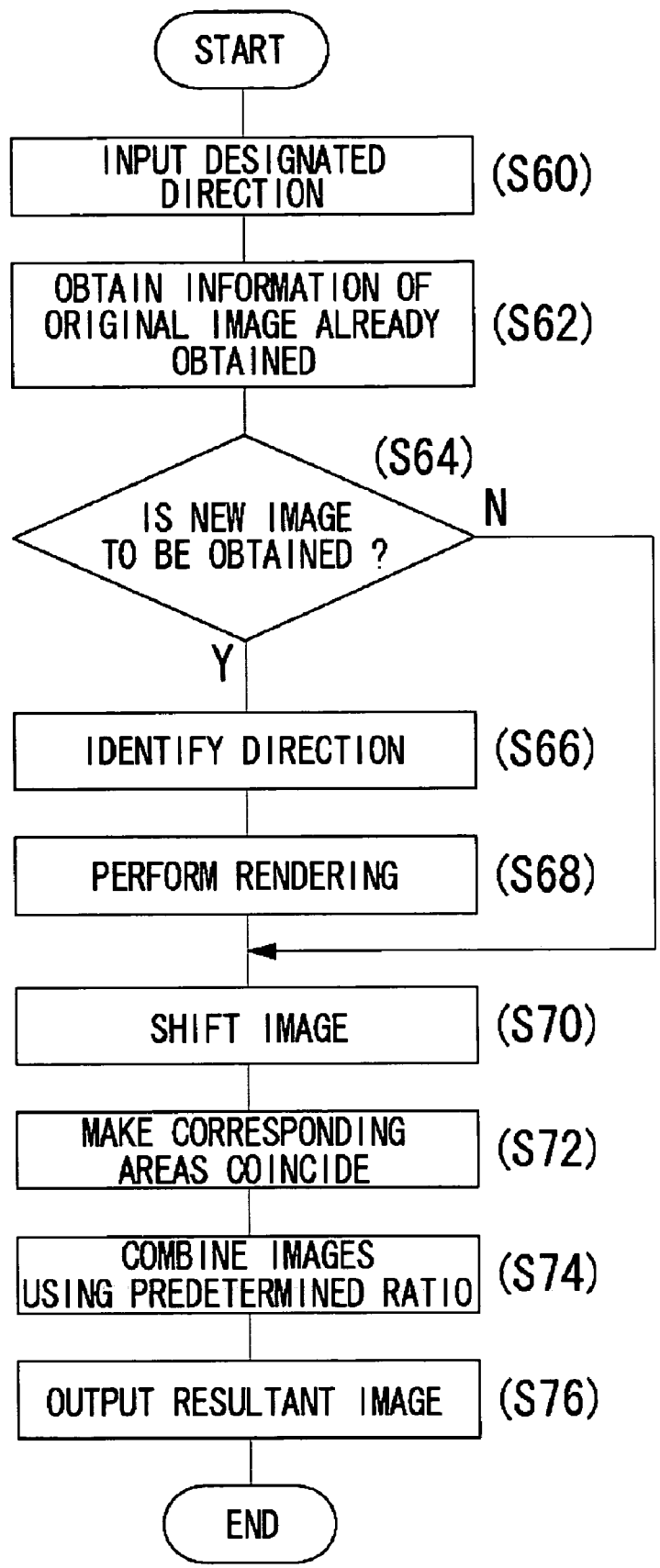
FIG. 14 is a flowchart of processing for generating a target image according to the apparatus illustrated in FIG. 13.

FIG. 14 shows a procedure for generating a target image by the image generating apparatus 100. A designated direction is inputted to the input unit 10 (S60). If any target image has been generated before, the update operation determining unit 26 obtains information about optimal original image pair already obtained, from the information obtaining unit 18 (S62). If a new optimal original image pair is required in order to generate a new target image (Y in S64), the image information identifying unit 42 identifies an optimal direction pair for the rendering processing (S66). The image calculating unit 44 performs the rendering processing upon three dimensional data in the first storage unit 20 with respect to the optimal direction pair (S68), so that the optimal original image pair is obtained. If the new optimal original image pair is not required (N in S64), an optimal original image pair already obtained is used. In order to make the direction of sight lines of the optimal original image pair coincide with the designated direction, the converting unit 32 shifts images of the optimal original image pair (S70) to generate intermediate images. The corresponding point matching unit 34 makes the corresponding areas of the intermediate images coincide (S72). The combining unit 36 combines the coincident intermediate images using a predetermined ratio (S74) to generate the target image. The generated target image is outputted from the output unit 38 (S76) and displayed on a display window for the monitor 110.

Figure 15A:
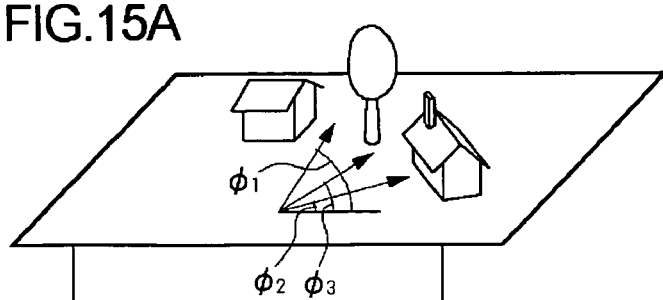
FIGS. 15A through 15H show generation of a target image according to the apparatus illustrated in FIG. 13.
Figure 15B:
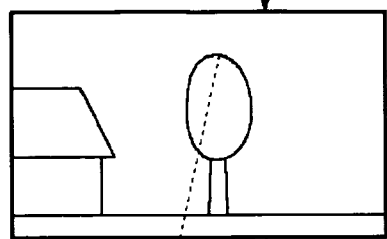
Figure 15C:
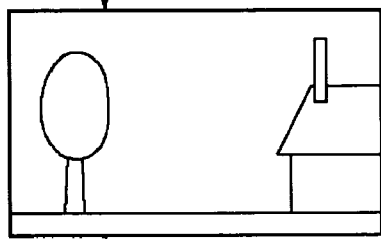

FIGS. 15A through 15H show generation of target image from an optimal original image pair by the image generating unit 16. FIG. 15A shows a virtual space including buildings and a tree. In the figure, the intersection of arrows indicates a point of view. Angles $\phi_1$ and $\phi_2$ constitute an optimal direction pair and an angle $\phi_3$ indicates a designated direction. FIG. 15B shows an original image obtained by a rendering processing in the image calculating unit 44 with respect to the angle $\phi_1$ based on three dimensional data. FIG. 15C shows an original image obtained by the rendering processing with respect to the angle $\phi_2$.

Figure 15D:
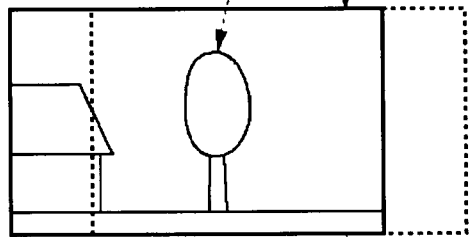
Figure 15E:
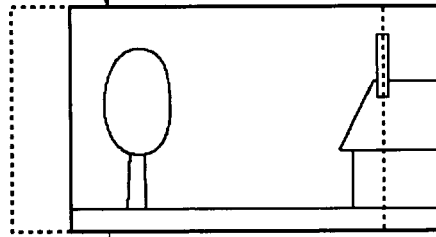
Figure 15F:
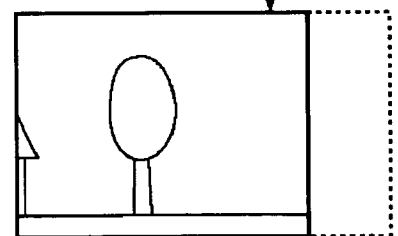
Figure 15G:
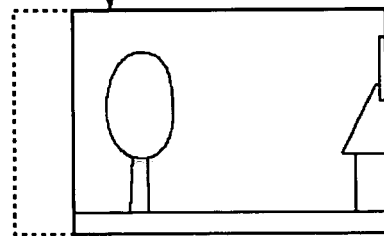
Figure 15H:
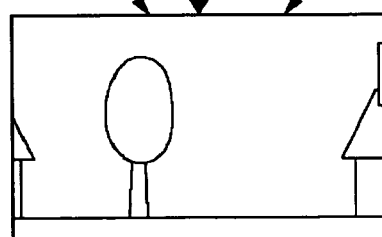

A turning radius is determined as the distance between the point of view and the tree. The converting unit 32 shifts the image illustrated in FIG. 15B by the distance calculated as a product of the angle $\phi_1-\phi_3$ and the turning radius and shifts the image illustrated in FIG. 15C by a distance calculated as a product of the angle $\phi_3-\phi_2$ and the turning radius, so that intermediate images illustrated in FIGS. 15D and 15E are generated, respectively. Clipping is performed upon the intermediate images in the range of image to be displayed. As a result, images illustrated in FIGS. 15F and 15G are obtained. The corresponding point matching unit 34 makes the corresponding positions of FIGS. 15F and 15G e.g., trees coincide. The combining unit 36 combines the image illustrated in FIG. 15F with the image illustrated in FIG. 15G using a predetermined ratio, so that the target image illustrated in FIG. 15H is generated.

The operation of the image generating apparatus 100 with the above-described structure is as follows. A user of a game is traveling at a predetermined movement speed in a predetermined direction by the user's instruction. If the direction of sight line coincides with the direction of travel, a change in the direction of travel by the user causes the direction of sight line to be changed and a designated direction is inputted to the input unit 10 accordingly. The image information identifying unit 42 identifies an optimal direction pair. The image calculating unit 44 generates an optimal original image pair for the optimal direction pair by a rendering processing. The converting unit 32 shifts the optimal original image pair so that the direction of sight line of the optimal original image pair coincides with the designated direction, so as to generate intermediate images. The corresponding point matching unit 34 causes the corresponding areas of the intermediate images to overlap at the same position. The combining unit 36 combines the intermediate images using a predetermined ratio to generate a target image. If a user changes the direction of travel again, rendering is not necessary when the designated direction is located between the directions of sight line of optimal original image pair already obtained, since a new target image is generated from the optimal original image pair already obtained.

In accordance with this embodiment, a target image with any direction of sight line is generated from an optimal original image pair with discrete directions of sight line so that the number of the rendering processes to be performed is reduced. An intermediate image which is generated from an original image with the direction of sight line approximating a designated direction is assigned a larger weight much, and the corresponding areas of intermediate images are made to overlap before combining them to produce the target image. Accordingly, when the designated direction is changed, the target image is also changed smoothly.

Fifth Embodiment

In accordance with this embodiment, when the range of target image on a display window is shifted by an instruction from a user and when the size of the range is changed, an image generating apparatus of this embodiment operates such that an apparent on-screen movement speed in the designated range (which hereinafter is referred to as "an apparent movement speed") remains an apparent movement speed prior to the change in the range. When the range of target image is enlarged, an object is relatively moved faster in the coordinate system (this movement speed will be referred to as "a movement speed in coordinate system" hereinafter) by maintaining the apparent movement speed.

Figure 16:
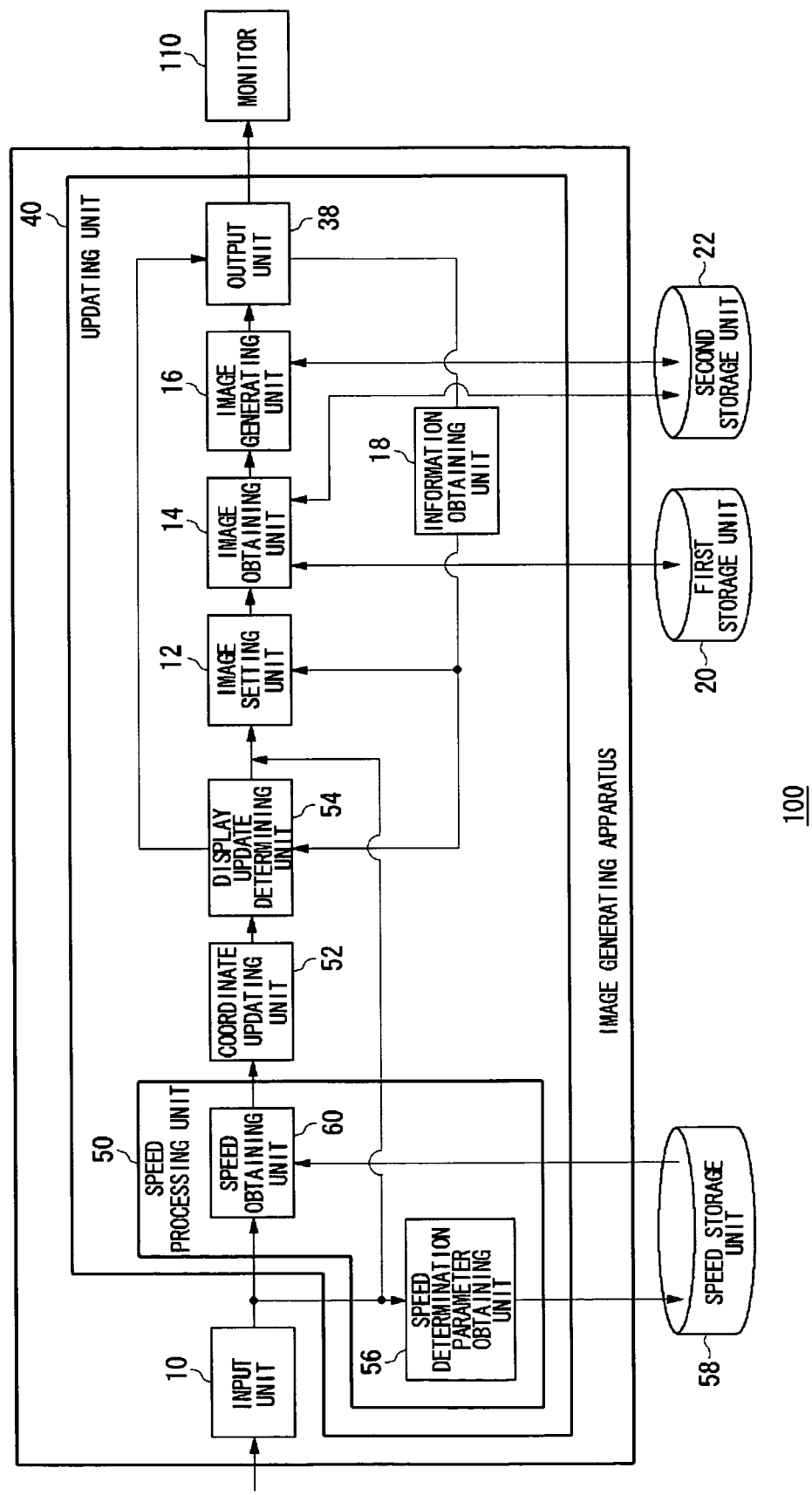
FIG. 16 shows a structure of an image generating apparatus according to a fifth embodiment.

FIG. 16 illustrates the structure of an image generating apparatus 100 which is of the same type as that of FIG. 1 and utilized in this embodiment. The image generating apparatus 100 has the input unit 10 and an updating unit 40. The updating unit 40 includes a speed processing unit 50, a coordinate updating unit 52, a display update determining unit 54, the image setting unit 12, the image obtaining unit 14, the image generating unit 16, the output unit 38 and the information obtaining unit 18. The speed processing unit 50 includes a speed determination parameter obtaining unit 56 and a speed obtaining unit 60. This image generating apparatus 100 is different from the image generating apparatus 100 illustrated in FIG. 3 in the speed processing unit 50, the coordinate updating unit 52 and the display update determining unit 54.

An operation instruction is inputted to the input unit 10 from a user. The speed determination parameter obtaining unit 56 determines a designated scale and the range of target image based on the operation instruction from the user inputted to the input unit 10.

A speed storage unit 58 stores numerical values and expressions required for relating the size of range of target image, an apparent movement speed and a movement speed in the coordinate system. It is assumed that a ratio of absolute length r of one side of the range of the target image in the coordinate system with respect to the movement speed v in the coordinate system is the apparent movement speed C. α indicates a constant with the dimension of distance.

$$\frac{v}{r} = \frac{C}{\alpha}$$

A constant relationship is established between the range of image to be displayed and the movement speed in the coordinate system.

If a user gives an instruction for faster movement, the displayed range is correspondingly widened. Thus, the display window is scrolled at a fixed speed irrespective of the movement speed in the coordinate system so that the user is capable of recognizing a map easily.

The speed obtaining unit 60 obtains the movement speed v in the coordinate system in a direction designated by the user, based on r and C.

The coordinate updating unit 52 calculates a movement distant per unit time from the movement speed in the coordinate system. The unit time is determined as the time elapsed since a predetermined target image is outputted onto the display window until the next target image is outputted on the display window. The calculated movement distance is added to a coordinate before movement in order to calculate a coordinate after movement. The resultant coordinate is used to update the target image.

The display update determining unit 54 determines whether the range of target image displayed using the coordinates after the movement requires an update in the current range of target image already displayed. Updating is usually required when the contents displayed on a screen are scrolled. Updating is not required when an object is moved while the background remains unchanged.

When the designated scale and the range of target image are determined as described above, a target image is generated in accordance with the above-described first to fourth embodiments.

Figure 17A:
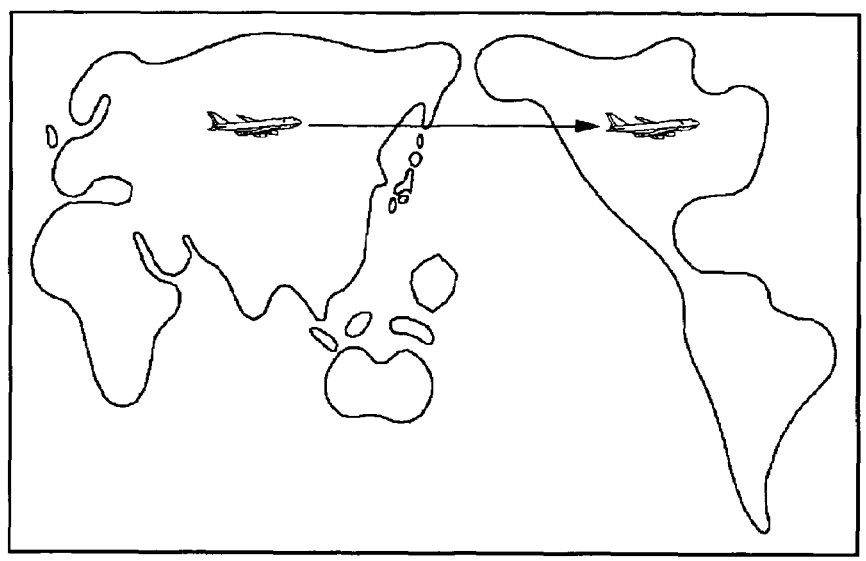
FIGS. 17A through 17C show a relationship between the size of range of target image and an apparent movement speed according to the apparatus illustrated in FIG. 16.
Figure 17B:
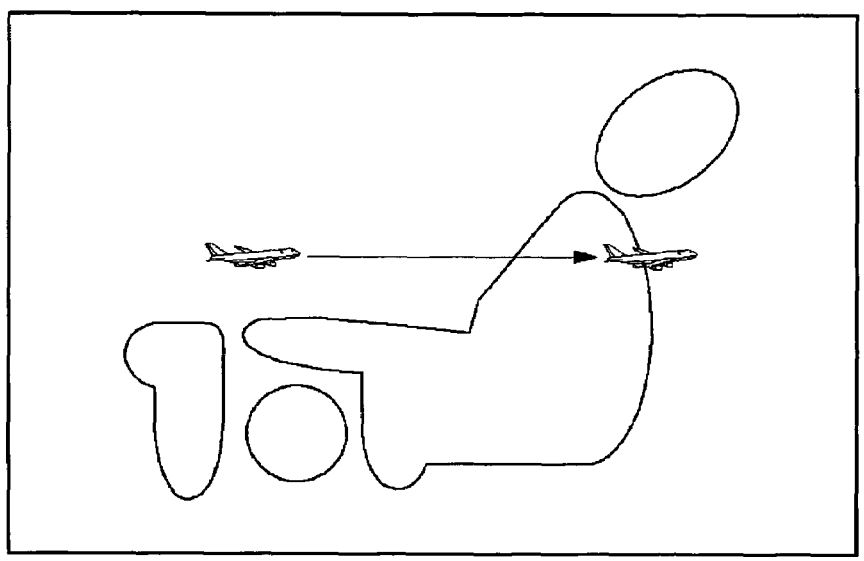
Figure 17C:
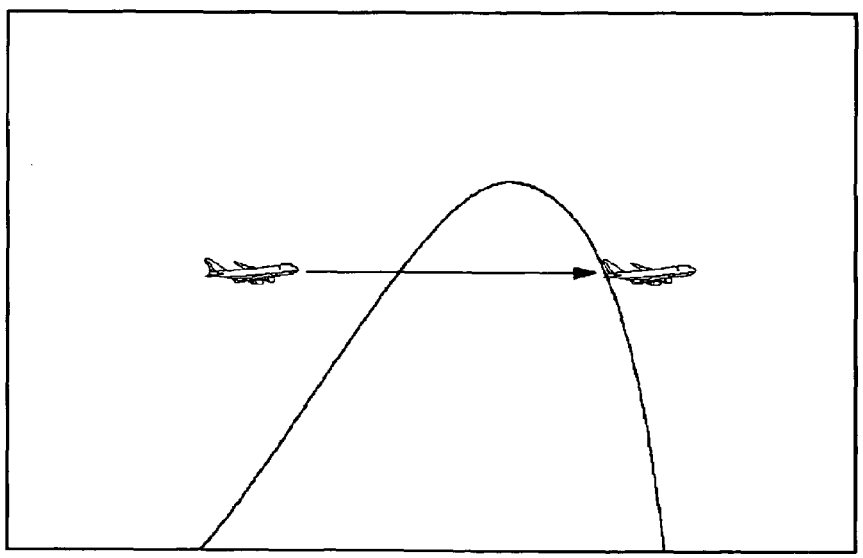

FIGS. 17A through 17C show an apparent movement speed for various sizes of the range of target image. One of the elements for determining the range of target image is an instruction for altitude of virtual point of view. As the altitude of virtual point of view is increased, the range of target image is enlarged. Of FIGS. 17A through 17C, the range of target image in FIG. 17A is the largest and the range of target image in FIG. 17C is the smallest. In all images, movement of an airplane object is indicated by an arrow. This arrow indicates movement on a screen per unit time. In spite of various ranges of target image, images are generated such that an apparent movement speed for the airplane remains constant. In these figures, the object is moving in the range of stationary target image. Alternatively, the object may be stationary and the range of target image may be shifted.

Figure 18:
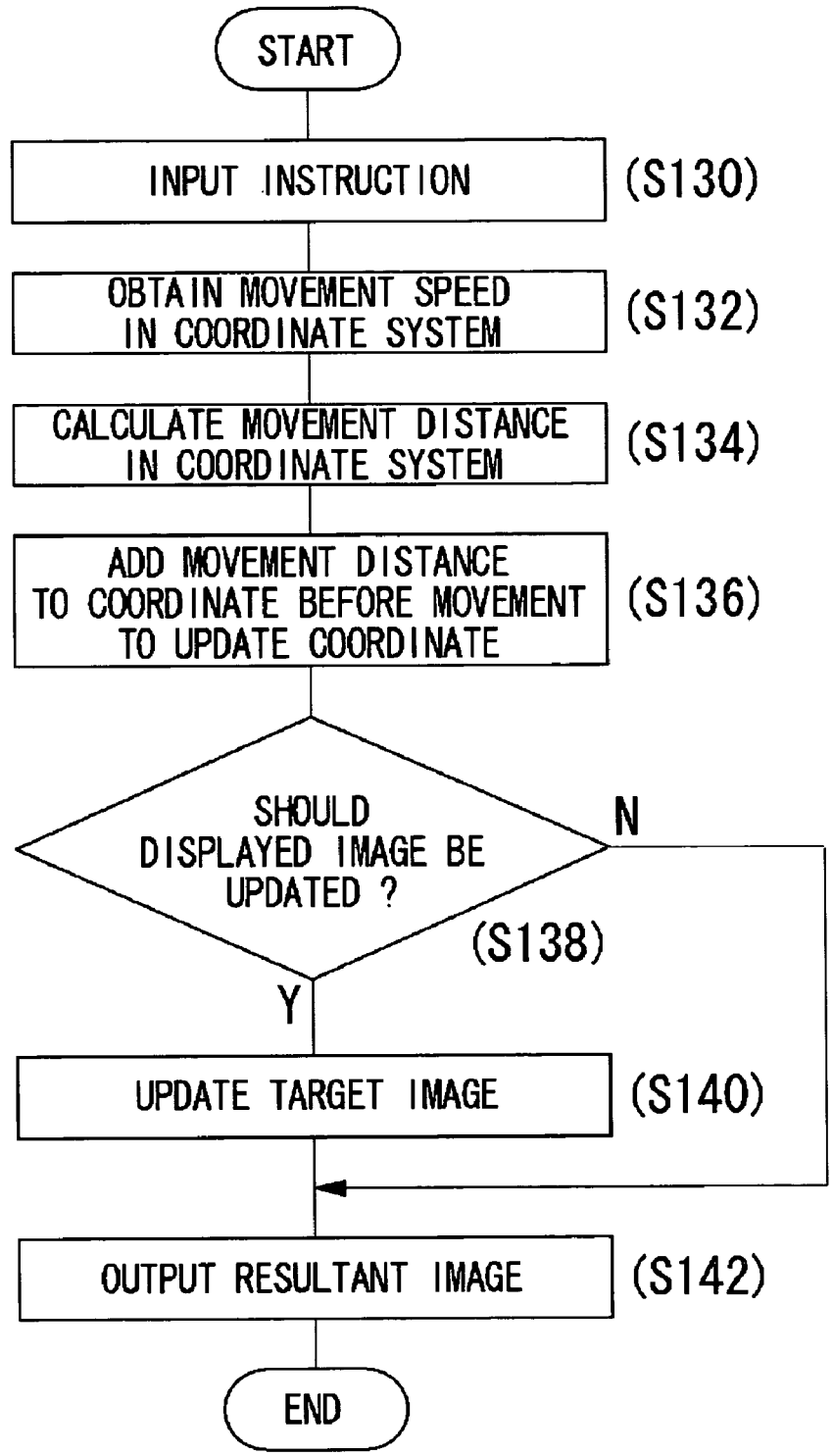
FIG. 18 is a flowchart of processing for generating an image to be displayed according to the apparatus illustrated in FIG. 16.

FIG. 18 shows a procedure for generating a target by the image generating apparatus 100 when an instruction for movement is given. The target image has already been displayed on a display window and a user gives an instruction to change the range of the target image. An operation instruction from a user is inputted to the input unit 10 illustrated in FIG. 16 (S130). On the basis of the size of range of the target image determined by a designated scale or the like, the speed determination parameter obtaining unit 56, the speed storage unit 58 and the speed obtaining unit 60 obtain a movement speed in the coordinate system (S132) and calculate the designated scale. The coordinate updating unit 52 calculates a movement distance in the coordinate system per unit time from the movement speed in the coordinate system (S134).

The movement distance in the coordinate system is added to the coordinate before the movement in order to update the coordinate (S136). The range of target image is calculated from the updated coordinate and the designated coordinate. If the currently displayed range of target image must be updated (Y in S138), the image setting unit 12, the image obtaining unit 14 and the image generating unit 16 generate a new target image (S140). The generated target image is outputted from the output unit 38 (S142) and displayed on the display window on the monitor 110.

The operation of the image generating apparatus 100 with the above-described structure is as follows. While a user of a game moves in the sky above Tokyo, a wide range of 23 Wards in Tokyo is displayed. Since an original image with a lower detail level and assigned a larger weight is blended with an original image with a higher detail level, a group of skyscrapers are displayed with relatively darker shades and the individual buildings included in the group are displayed with relatively lighter shades. When the user decreases an altitude and a movement speed near the group of skyscrapers, in accordance with such operation, the range of Tokyo displayed becomes narrower until the view is restricted to Shinjuku Ward, for example. The individual buildings displayed with lighter shades are gradually displayed more clearly. Nevertheless, at the same time, the buildings are still displayed as the group. Thus, even if the contents of display are changed in accordance with a change in the movement speed, user's operability does not suffer. In accordance with such an operation, when a user is moving at a high speed, buildings are not displayed individually and thus excess information is provided from being provided to the user. If the user is interested in a part of the displayed information, appropriate information is supplied to the user when the speed is decreased. In a user's operation for movement, the speed at which displayed images are scrolled is fixed. Thus, the user is capable of viewing information uniformly regardless of the movement speed.

In accordance with this embodiment, image generation is performed such that, even if the size of range of target image is changed, an apparent on-screen movement speed in the range of target image remains an apparent movement speed before the change. As a result, a user can continue to move without unpleasant feelings. As a user gets closer to a destination, a movement speed in the coordinate system is decreased, so that the user is capable of reaching the precise destination.

Sixth Embodiment

In accordance with this embodiment, as in the fifth embodiment, an instruction about movement and a designated scale is inputted from a user and the range of target image is shifted as the user travels in a scene. Further, according to this embodiment, in addition to input of designated scale from a user, conditions for automatically changing the size of range of target image are set. If such conditions are satisfied, the range of target image is forcibly shifted in accordance with the conditions.

Figure 19:
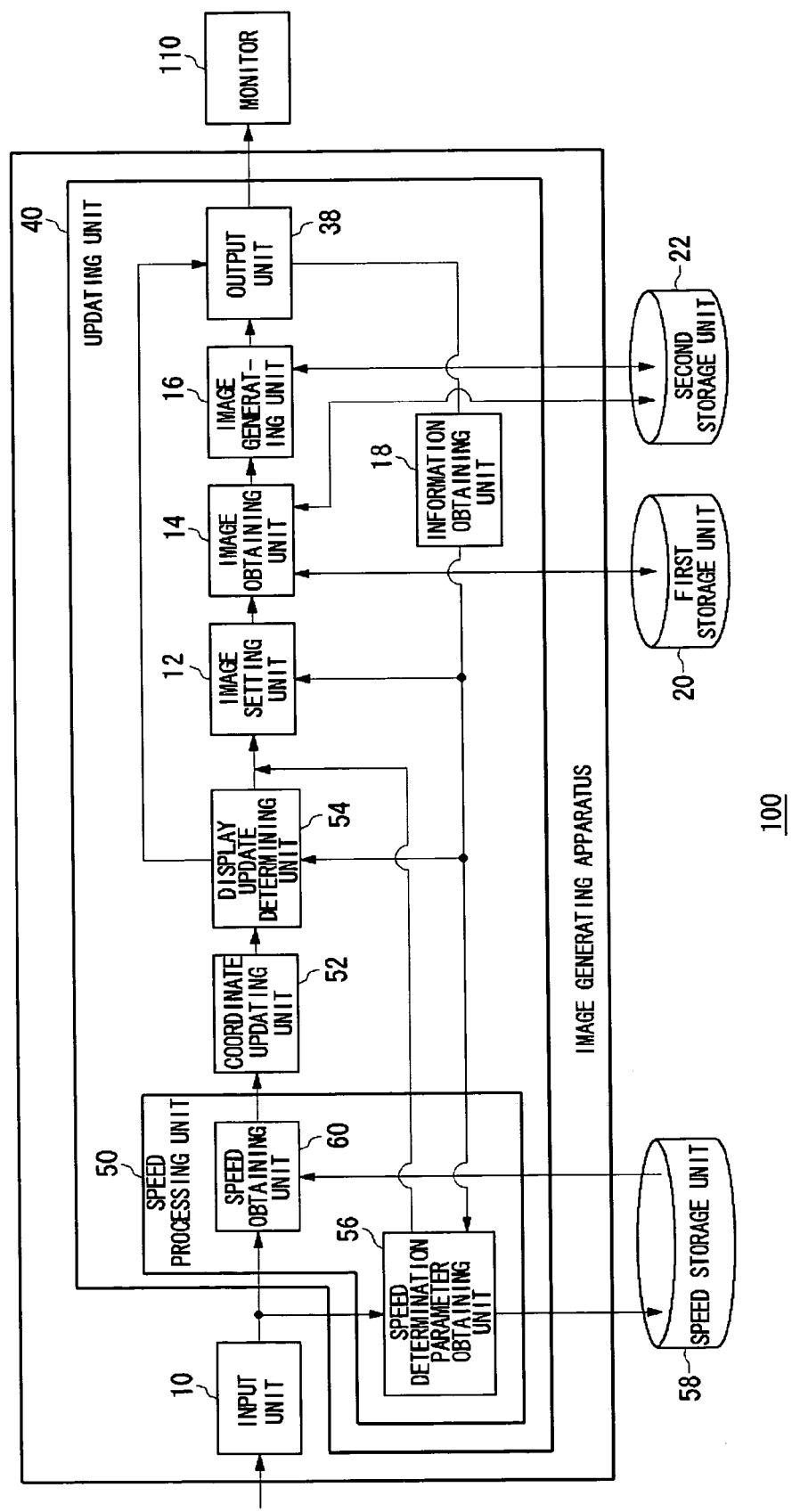
FIG. 19 shows a structure of an image generating apparatus according to a sixth embodiment.

FIG. 19 shows the structure of an image generating apparatus 100 which is of the same type as that illustrated in FIG. 11 and utilized in this embodiment. The image generating apparatus 100 has the input unit 10 and the updating unit 40.

The updating unit 40 includes the speed processing unit 50, the coordinate updating unit 52, the display update determining unit 54, the image setting unit 12, the image obtaining unit 14, the image generating unit 16, the output unit 38 and the information obtaining unit 18. The speed processing unit 50 includes the speed determination parameter obtaining unit 56 and the speed obtaining unit 60. This image generating apparatus 100 is different from the image generating apparatus 100 illustrated in FIG. 3 in the speed processing unit 50, the speed storage unit 58, the coordinate updating unit 52 and the display update determining unit 54, and is different from the image generating apparatus 100 illustrated in FIG. 16 in the operation of the speed determination parameter obtaining unit 56.

The speed determination parameter obtaining unit 56 generates an instruction for forcibly changing the size of range of target image in addition to a designated scale based on an operation instruction from a user. This instruction may be generated on the basis of processing in the speed determination parameter obtaining unit 56 or may be generated in accordance with an instruction about a movement direction inputted from a user.

In the former case, an area where the range of target image should be automatically changed is set in advance in an image. Then, when a user enters this area, the size of range of target image is changed. In the latter case, when successive directions of movement inputted from the input unit 10 coincide, the size of range of target image is increased.

The image setting unit 12, the image obtaining unit 14, the image generating unit 16, the output unit 38 and the information obtaining unit 18 generate a target image in the same manner as in the first to fourth embodiments.

Figure 20:
FIG. 20 shows a structure of data for changing the size of range of target image according to the apparatus illustrated in FIG. 19.

FIG. 20 shows a data file in which an area where the size of range of target image is forcibly decreased and an area where the size of range of target image is forcibly increased are set (these areas will be generically referred to as "operation areas" hereinafter). When an object enters the operation area, the entry is detected on the basis of coordinates by the speed determination parameter obtaining unit 56 so that the size of range of target image is changed. In this embodiment, the operation area is set in advance depending on the presence or absence of object a user should pay attention to. This file is stored in the speed storage unit 58. As in FIG. 5, an operation area with a predetermined scale is specified by a data start point and a data end point.

The item "ID" within the file indicates an instruction for changing the size of range of target image. The character "U" indicates an instruction for enlarging the range of target image and the character "D" indicates an instruction for reducing the range of target image. For example, an area which does not include an object a user should pay attention to may be determined as "the area where the range of target image is enlarged", i.e., an enlarged area. In this case, the user can pass the corresponding area at a high speed. An area which includes an object a user should pay attention to or a specific point in data processing may be determined as "the area where the range of target image is reduced", i.e., a reduced area. In this case, the user is capable of moving in the area slowly and easily recognizing the presence of the area.

Figure 21:
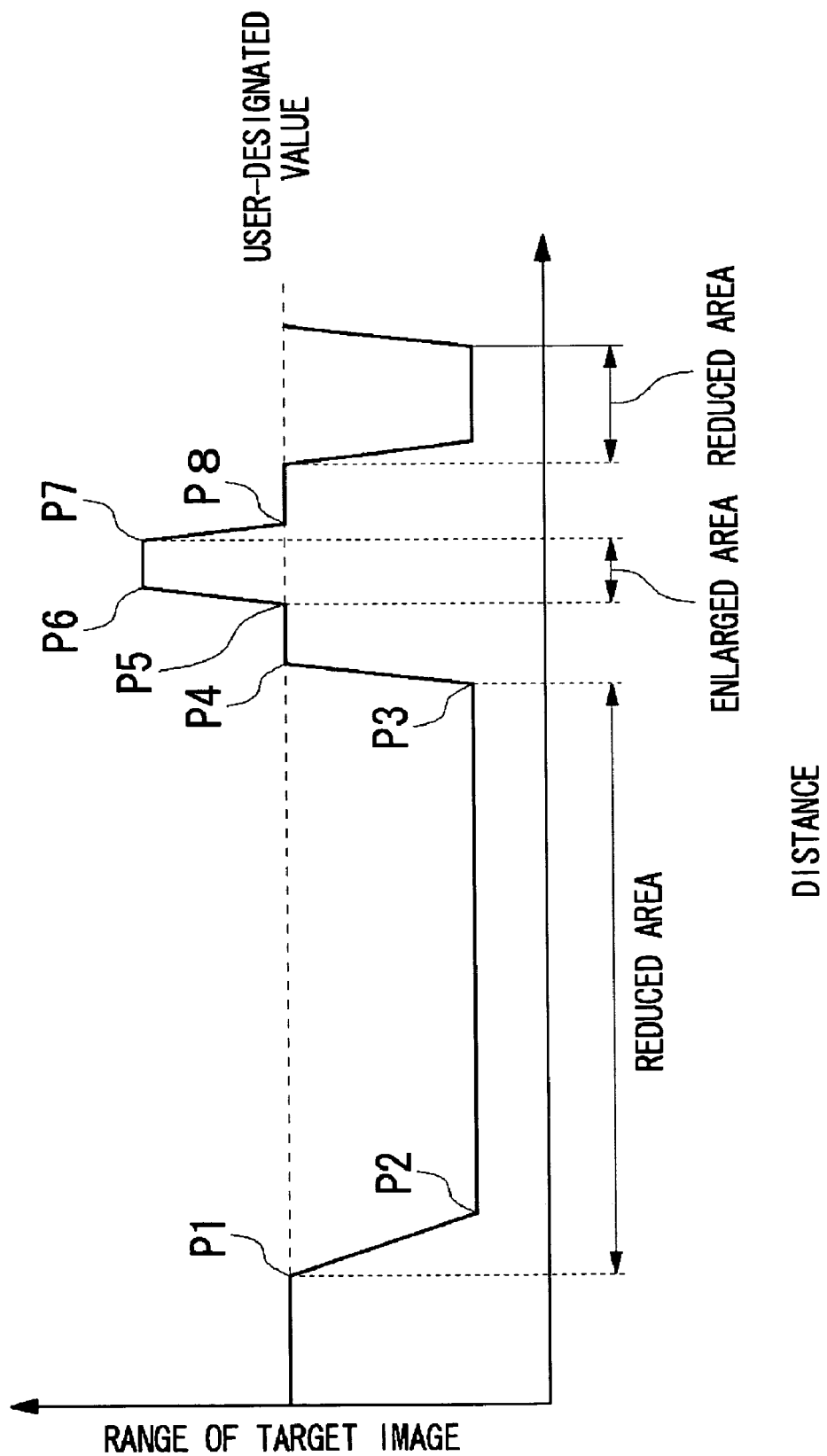
FIG. 21 shows a movement distance and the range of target image according to the apparatus illustrated in FIG. 19.

FIG. 21 shows changes in the size of range of target image when the user passes through the operation area. In an initial state, the size of range of target image is determined by a user-designated value, i.e., a designated scale. When the user enters a reduced area at P1, the range of target image is reduced by the speed determination parameter obtaining unit 56 and the movement speed in the coordinate system is decreased without the user performing an operation for decreasing the speed. Thus, the user is capable of understanding the contents in the range of target image in detail. When the user remains in the reduced area, the range of target image continues to be gradually reduced so that detailed information is displayed even more clearly. Referring to FIG. 21, at P2, the user is in the minimum range of target image set in advance. Between P2 to P3, at which the user exits the reduced area, the system awaits a user's instruction to return to the original range. When the user exits the reduced area at P3, the size of range at P4 is determined by the operation instruction from the user. When the user enters the enlarged area at P5, the size of range at P6 becomes maximum determined in view of visibility as described above. Thus, the speed at which the user moves in the coordinate system is increased so that the user is capable of traveling swiftly in the area which does not include objects the user should pay attention to. When the user exits the enlarged area at P7, the range of target image returns to a size determined by the user-designated value again at P8.

As described above, in accordance with this embodiment, whether the range of target image should be enlarged or reduced is determined depending on coordinates so that the range of target image is changed accordingly, regardless of the operation instruction from a user. As a result, it is ensured that the user is capable of recognizing information that must be recognized.

The operation of the image generating apparatus 100 with the above-described structure is as follows. While a user of a game is moving as a pedestrian like walking in a street, for example, the user may enter an enlarged area, e.g. a desert. The speed obtaining unit 60 then obtains a higher movement speed in the coordinate system. The coordinate updating unit 52 calculates a movement distance in the coordinate system from the movement speed in the coordinate system, adds this movement distance to the original coordinate to update the coordinate. On the basis of the updated coordinate, the image setting unit 12, the image obtaining unit 14 and the image generating unit 16 update the target image, resulting in an image with an elevated point of view above the desert instead of a point of view of a user walking in the desert. As a result, the user is capable of swiftly passing through the desert that the user is not interested in.

Figure 22:
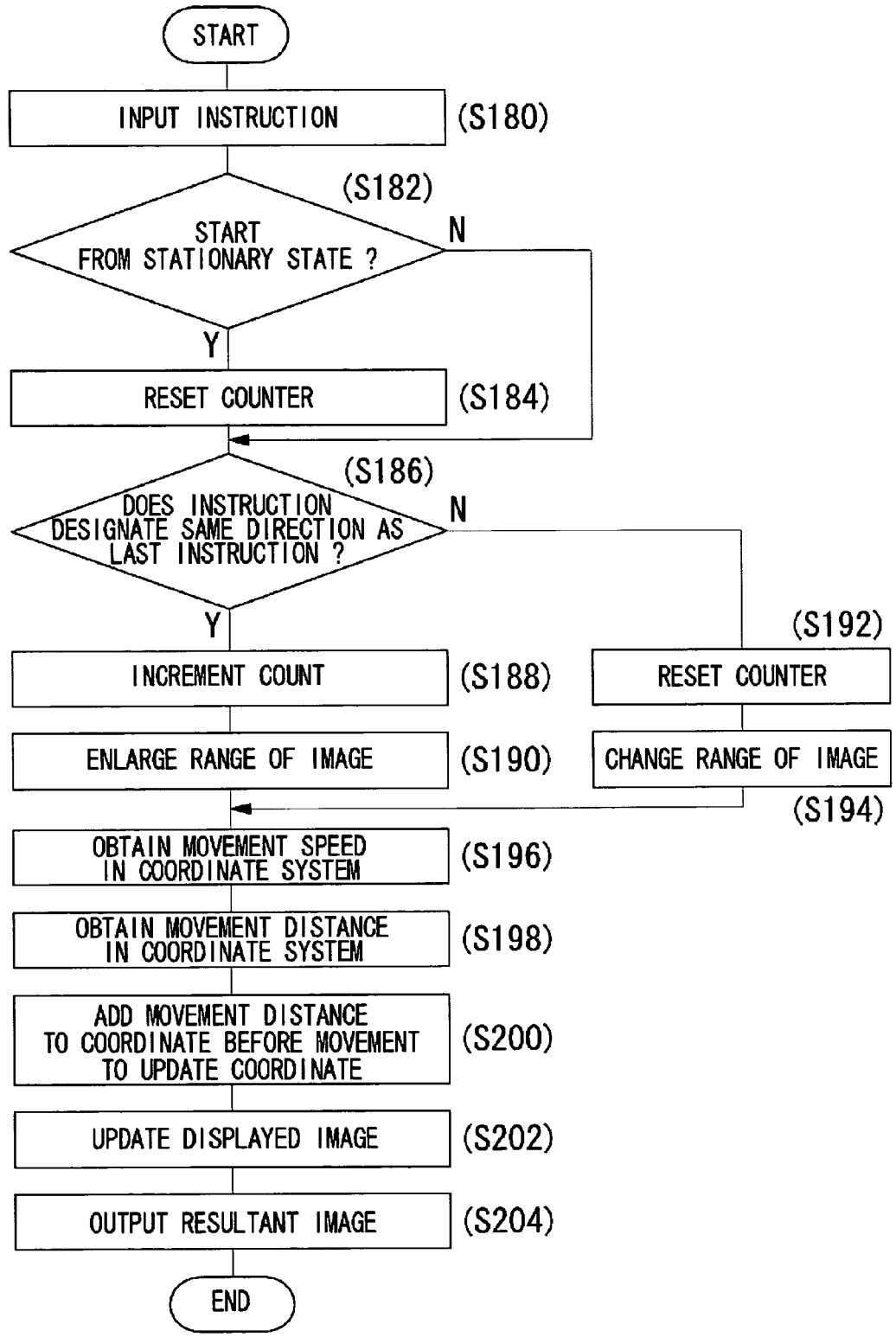
FIG. 22 is a flowchart of processing for generating a target image according to the apparatus illustrated in FIG. 19.

A variation of the sixth embodiment will be described. FIG. 22 illustrates a procedure for changing, when the range of target image is shifted successively in the same direction, the size of range of target image in accordance with the degree of succession, in the speed determination parameter obtaining unit 56. A movement instruction is inputted to the input unit 10 illustrated in FIG. 19 in response to the user's operation (S180). If this movement instruction is inputted in a state in which the range of target image remains stationary, it is determined that a movement is started (Y in S182) and the speed determination parameter obtaining unit 56 resets a counter included therein (S184). If a direction of movement according to the instruction is the same as that of the instruction inputted the last time (Y in S186), a count is incremented (S188). Further, for example, on the basis of a predetermined rule which states that, when a count reaches 10, the range of target image is made twice as large, the speed determination parameter obtaining unit 56 outputs an instruction for changing the size of range of target image. The image setting unit 12, the image obtaining unit 14 and the image generating unit 16 change the size of range of target image accordingly (S19O). If the direction of movement according to the instruction is different from that of the movement instruction inputted the last time (N in S186), the counter is reset (S192). Then, the size of range of target image is returned to an initially set value or the size calculated from the designated scale provided by the user (S194). The speed obtaining unit 60 obtains the movement speed in the coordinate system on the basis of the range of target image (S196). The subsequent operations are the same as those in FIG. 18.

In accordance with the variation described above, when a user continues to input instructions for movement in a fixed direction, the movement speed in the coordinate system is correspondingly changed. Thus, in spite of a simple interface, the movement speed in the coordinate system is changed properly. Generally, when a user continues to give instructions for movement in a fixed direction, it is assumed that the user desires faster movement. Thus, an object of operation by the user is properly satisfied according to the variation.

The present invention has been described using the various embodiments. A person skilled in the art would understand that these embodiments are merely illustrations, modified example are possible by combinations of components and processes thereof and such modified examples fall within the scope of the present invention. The modified examples will be described below.

Although the first through sixth embodiments assume map image applications and games, applications of the embodiments are not restricted to them. For example, the embodiments may be applied to car navigation. In the case of car navigation, a scale of a map is changed in accordance with a speed of vehicle and yet a point of interest such as a building is properly recognized before and after a change in speed. Thus, it is possible to prevent the user from losing sight of a target. As such, the present invention finds wide applications for display of a predetermined space or object on a display unit.

In the first through sixth embodiments, two original images are identified in order to generate a target image. The obtaining identifying unit 28 needs not to identify two original images. Three or more original images may be identified. When three or more original images are identified, the combining unit 36 desirably sets a ratio of combining intermediate images generated from the original images, in accordance with a plurality of intermediate images. For example, as in the first embodiment, a relatively large weight is assigned to an intermediate image corresponding to an original image with a scale approximating a designated scale. According to this modified example, a target image which reflects the contents of a lot of original images is generated. That is, an image in a range to be displayed is generated smoothly in accordance with changes in predetermined parameters related to the image.

In the first through sixth embodiments, the image obtaining unit 14 selects an optimal original image pair corresponding to the entire range of target image in order to generate the target image. The optimal original image pair needs not to be selected so as to correspond to the entire range of target image. For example, different optimal original image pairs may be selected for different sets of coordinates within the range of target image. Pixel values displayed for the coordinates may be obtained by combining corresponding pixel values in the optimal original image pair. In accordance with this modified example, only a part of the range of target image may be displayed in greater detail as compared to other parts.

In the first through sixth embodiments, the combining unit 36 combines two intermediate images using one predetermined ratio. Alternatively, a plurality of ratios may be provided. For example, different ratios may be used for reducing the size of range of target image and for enlarging the same. In the former case, combination is performed such that a relatively large weight is assigned to an intermediate image generated from an original image with a smaller scale. In the latter case, combination is performed such that the aforementioned weight is smaller. According to this modified example, contents displayed before the size of range of target image is changed affect the target image to a relatively larger degree. Accordingly, unpleasant feelings felt by the user for changes in the size of range of target image are alleviated.

According to the fifth and sixth embodiments, the movement speed in the coordinate system depends on the size of range of target image. If the size of range of target image is determined, the movement speed in the coordinate system is also uniquely determined. However, one-to-one correspondence need not be established between the size of range of target image and the movement speed in the coordinate system, in the speed processing unit 50. For example, in order to visualize the effect of inertia in a case in which a stationary state is changed to an active state or vice versa, the movement speed in the coordinates system may be gradually increased or decreased, respectively, even if the size of range of target image remain fixed. The speed processing unit 50 may delay a change in the size of range of target image when a change in the movement speed in the coordinate system occurs. According to this modified example, the user's unpleasant feelings are further alleviated for changes in the size of range of target image in accordance with changes in the movement speed.

An operation area is stored in advance as a data file in the sixth embodiment. In the speed determination parameter obtaining unit 56, the operation area needs not to remain registered in the data file and areas may be deleted or added. For example, in a game, an area with a high density of objects that a user should pay attention to may first be as an enlarged area in the range of target image. When the density becomes lower in accordance with a progress of the game, this area may be deleted from registration. According to this modified example, flexible processing in a game in accordance with its scenario is enabled. That is, the data file may be appropriately modified.

Although the present invention has been described by way of exemplary embodiments, it should be understood that many changes and substitutions may further be made by those skilled in the art without departing from the scope of the present invention which is defined by the appended claims.

What is claimed is:

1. An image generating apparatus comprising:
   an input unit inputting an instruction about a shift of a range of an image to be displayed on a screen;
   a determination unit for determining, when said range is successively shifted, a predetermined parameter value related to an image to be displayed based on an altitude of virtual point of view according to a movement speed in a coordinate system in an instructed direction;
   an obtaining unit for identifying a plurality of original images with respective parameters defined based on the parameter value determined by the determination unit, and for obtaining the plurality of original images identified; and
   an image generating unit for performing a predetermined converting process upon the plurality of original images so that the parameter values of the plurality of original images match the parameter value determined by the determination unit, and for outputting a final image obtained by combining the plurality of original images so that their corresponding areas are made to overlap, wherein:
   when the movement speed in the coordinate system in the instructed direction changes, the determination unit updates the parameter value so that an on-screen movement speed of an image currently displayed on the screen is maintained; and
   the image generating unit performs a processing so that the parameter value of the final image matches the parameter value updated in the determination unit.

2. An image generating apparatus according to claim 1, wherein said determination unit detects when said range enters a predetermined area set in advance in an original image and changes the size of said range.

3. An image generating apparatus according to claim 2, wherein said predetermined area is set depending on the existence of objects a user should pay attention to.

4. An image generating apparatus according to claim 1, wherein when the instruction defines a direction identical with that defined by the previous instruction, said determination unit increments the count and changes the size of said range in accordance with the incremented count value.

5. An image generating method comprising:
   inputting an instruction about a shift of a range of an image to be displayed on a screen;
   determining, when said range is successively shifted, a predetermined parameter value related to an image to be displayed based on an altitude of virtual point of view according to a movement speed in a coordinate system in an instructed direction;
   identifying a plurality of original images with respective parameters defined based on the parameter value determined by the determining, and obtaining the plurality of original images identified; and
   performing a predetermined converting process upon the plurality of original images so that the parameter values of the plurality of original images match the parameter value determined by the determining, and outputting a final image obtained by combining the plurality of original images so that their corresponding areas are made to overlap, wherein:
   when the movement speed in the coordinate system in the instructed direction changes, the determining updates the parameter value so that an on-screen movement speed of an image currently displayed on the screen is maintained; and
   the performing matches the parameter value of the final image to the parameter value updated in the determining.

6. A program embodied on a computer readable medium to control a processor to implement the method of:
   inputting an instruction about a shift of a range of an image to be displayed on a screen; and
   determining, when said range is successively shifted, a predetermined parameter value related to an image to be displayed based on an altitude of virtual point of view according to a movement speed in a coordinate system in an instructed direction;
   identifying a plurality of original images with respective parameters defined based on the parameter value determined by the determining, and obtaining the plurality of original images identified; and
   performing a predetermined converting process upon the plurality of original images so that the parameter values of the plurality of original images match the parameter value determined by the determining, and outputting a final image obtained by combining the plurality of original images so that their corresponding areas are made to overlap, wherein:
   when the movement speed in the coordinate system in the instructed direction changes, the determining updates the parameter value so that an on-screen movement speed of an image currently displayed on the screen is maintained; and the performing matches a processing so that the parameter value of the final image to the parameter value updated in the determining.

7. A computer-readable recording medium which stores a program executable by a computer, the program including the functions of:

inputting an instruction about a shift of a range of an image to be displayed on a screen;

determining, when said range is successively shifted, a predetermined parameter value related to an image to be displayed based on an altitude of virtual point of view according to a movement speed in a coordinate system in an instructed direction;

identifying a plurality of original images with respective parameters defined based on the parameter value determined by the determining, and obtaining the plurality of original images identified; and performing a predetermined converting process upon the plurality of original images so that the parameter values of the plurality of original images match the parameter value determined by the determining, and outputting a final image obtained by combining the plurality of original images so that their corresponding areas are made to overlap, wherein:

when the movement speed in the coordinate system in the instructed direction changes, the determining updates the parameter value so that an on-screen movement speed of an image currently displayed on the screen is maintained; and the performing matches the parameter value of the final image to the parameter value updated in the determining.

* * * * *